United States Patent [19]
Watanabe et al.

[11] Patent Number: 4,492,450
[45] Date of Patent: Jan. 8, 1985

[54] CAMERA WITH MICROPROCESSOR

[75] Inventors: Koji Watanabe; Kazuo Shiozawa; Kiziro Suzuki, all of Tokyo; Ryushi Shimokawa, Takasaki, all of Japan

[73] Assignee: Konishiroku Photo Industry Co., Ltd., Tokyo, Japan

[21] Appl. No.: 423,783

[22] Filed: Sep. 27, 1982

[30] Foreign Application Priority Data

Sep. 30, 1981 [JP] Japan ................................ 56-156814

[51] Int. Cl.³ .............................................. G03B 7/00
[52] U.S. Cl. ................................................... 354/412
[58] Field of Search ................... 354/23 D, 60 A, 412

[56] References Cited
U.S. PATENT DOCUMENTS

| | | | |
|---|---|---|---|
| 4,103,307 | 7/1978 | Shinoda et al. | 354/60 A |
| 4,299,466 | 11/1981 | Harvey | 354/23 D |
| 4,304,472 | 12/1981 | Shinoda et al. | 354/23 D |

OTHER PUBLICATIONS

*Microcomputer Dictionary & Guide* by Sippl, 1976, pp. 172-175.

Primary Examiner—Russell E. Adams
Attorney, Agent, or Firm—James E. Nilles

[57] ABSTRACT

A camera having a microprocessor made receptive of various photographic informations through interrupt processing. The information at a higher priority level of said various photographic informations such as a release signal, a photometry start signal and a photometry introduction signal is fed to said microprocessor by the interrupting operation having a shorter period than that of the information at a lower priority level. The interrupt processing are periodic ones, and wherein an inequality of $m < n$ holds when the information at the higher priority level of said various photographic informations is fed with a period m times as long as an interrupt period whereas the information at the lower priority level is fed with a period n times as long as said interrupt period.

8 Claims, 45 Drawing Figures

FIG. 10

| BIT ADDRESS | (MSB) 7 | 6 | 5 | 4 | 3 | 2 | 1 | (LSB) 0 | |
|---|---|---|---|---|---|---|---|---|---|
| 0 0 | (← | | | Fo VALUE | | | | →) | |
| 0 1 | (← | | | ASA VALUE | | | | →) | S VALUE |
| 0 2 | (← | | | LV VALUE | | | | →) | P VALUE |
| 0 3 | $S_2$ | $S_T$ | EF1 | EF2 | B | AM | BC1 | BC2 | MODE INPUT (DAT 1) |
| 0 4 | $S_F$ | $S_M$ | ME | AEL | $S_B$ | $S_R$ | FS | $S_C$ | MODE INPUT (DAT 2) |
| 0 5 | $S_I$ | | | | | | | ADE | MONITOR |
| 0 6 | (← | | | T VALUE | | | | →) | ARITHMETIC RESULT |
| 0 7 | (← | | | F VALUE | | | | →) | ARITHMETIC RESULT |
| 0 8 | 15.5 msecs | 8 msecs | 6 msecs | 4 msecs | 2 msecs | 1 msec | 0.48 msec | 0.24 msec | SHUTTER MODE 1 |
| 0 9 | 4 secs | 2 secs | 1 sec | 500 msecs | 250 msecs | 125 msecs | 65 msecs | 32 msecs | SHUTTER MODE 2 |
| 0 A | $\phi_S$ | $\phi_{STS}$ | AEL MODE | B MODE | $S_T$ MODE | AUTO MODE | EF2 MODE | EF1 MODE | TAKING MODE |
| 0 B | | | | 8 Hz FLASH | 4 Hz FLASH | 2 Hz FLASH | 1 Hz FLASH | HIGH BRIGHTNESS | LOW BRIGHTNESS | INDICATION MODE |
| 0 C | | | | | | PRH1 | PRH2 | F | FLAG |
| 0 D | DOWN COUNTER PRESET | | | | | | | | |
| 0 E | FS PRESET | | | | | | | | |
| 0 F | (256 msecs) | (128 msecs) | (64 msecs) | (32 msecs) TC1 | (16 msecs) | (8 msecs) | (4 msecs) | (2 msecs) | |
| 1 0 | (64 secs) | (32 secs) | (16 secs) | (8 secs) TC2 | (4 secs) | (2 secs) | (1 sec) | (512 msecs) | |
| 1 1 | (← | | | DA DYNAMIC I/O ADDRESS | | | | →) | |
| 1 2 | | | | L1 | L2 | L3 | LM | LS | |
| 1 3 | | | $\alpha$ | $\beta$ | $\gamma$ | $\delta$ | MM | MF | |
| 1 4 | | | | | PH | | | ADS | |
| 1 5 | (← | ASA | | →) | (← | Fo | | →) | |
| 1 6 | (← | | | TC3 | | | | →) | |

|  | USUALLY BINARY DIGITS | ALTERNATE BINARY DIGITS |  | USUALLY BINARY DIGITS | ALTERNATE BINARY DIGITS |
|---|---|---|---|---|---|
| 0 | 00000 | 00000 | 16 | 10000 | 11000 |
| 1 | 00001 | 00001 | 17 | 10001 | 11001 |
| 2 | 00010 | 00011 | 18 | 10010 | 11011 |
| 3 | 00011 | 00010 | 19 | 10011 | 11010 |
| 4 | 00100 | 00110 | 20 | 10100 | 11110 |
| 5 | 00101 | 00111 | 21 | 10101 | 11111 |
| 6 | 00110 | 00101 | 22 | 10110 | 11101 |
| 7 | 00111 | 00100 | 23 | 10111 | 11100 |
| 8 | 01000 | 01100 | 24 | 11000 | 10100 |
| 9 | 01001 | 01101 | 25 | 11001 | 10101 |
| 10 | 01010 | 01111 | 26 | 11010 | 10111 |
| 11 | 01011 | 01110 | 27 | 11011 | 10110 |
| 12 | 01100 | 01010 | 28 | 11100 | 10010 |
| 13 | 01101 | 01011 | 29 | 11101 | 10011 |
| 14 | 01110 | 01001 | 30 | 11110 | 10001 |
| 15 | 01111 | 01000 | 31 | 11111 | 10000 |

F I G. 13 (a)

| EV \ ASA | 25 | 50 | 100 | 200 | 400 | 800 | 1600 | 3200 |
|---|---|---|---|---|---|---|---|---|
| 0/3 | 00000 00 00 | 00010 03 0A | 00101 06 14 | 01101 09 1E | 01010 0C 28 | 01000 0F 32 | 11011 12 3C | 11111 15 46 |
| 1/3 | 00001 01 03 | 00110 04 0D | 00100 07 17 | 01111 0A 21 | 01011 0D 2B | 11000 10 35 | 11010 13 3F | 11101 16 49 |
| 2/3 | 00011 02 06 | 00111 05 10 | 01100 08 1A | 01110 0B 24 | 01001 0E 2E | 11001 11 38 | 11110 14 42 | 11100 17 4C |

F I G. 13 (b)

| EV \ Fo | 1.0 | 1.4 | 2 | 2.8 | 4 | 5.6 | 8 | 11 |
|---|---|---|---|---|---|---|---|---|
| 1 | 00 | 0A | 14 | 1E | 28 | 32 | 3C | 46 |

F I G. 13 (c)

| EV \ Bv | -4 | -3 | -2 | -1 | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|---|---|---|
| 0/10 | 00 | A | 4 | E | 8 | 2 | C | 6 | 50 | A | 4 | E | 8 | 2 | C | 6 | A0 | A | 4 | E | 8 | 2 |
| 1/10 | 1 | B | 5 | F | 9 | 3 | D | 7 | 1 | B | 5 | F | 9 | 3 | D | 7 | 1 | B | 5 | F | 9 | 3 |
| 2/10 | 2 | C | 6 | 20 | A | 4 | E | 8 | 2 | C | 6 | 70 | A | 4 | E | 8 | 2 | C | 6 | C0 | A | 4 |
| 3/10 | 3 | D | 7 | 1 | B | 5 | F | 9 | 3 | D | 7 | 1 | B | 5 | F | 9 | 3 | D | 7 | 1 | B | 5 |
| 4/10 | 4 | E | 8 | 2 | C | 6 | 40 | A | 4 | E | 8 | 2 | C | 6 | 90 | A | 4 | E | 8 | 2 | C | 6 |
| 5/10 | 5 | F | 9 | 3 | D | 7 | 1 | B | 5 | F | 9 | 3 | D | 7 | 1 | B | 5 | F | 9 | 3 | D | 7 |
| 6/10 | 6 | 10 | A | 4 | E | 8 | 2 | C | 6 | 60 | A | 4 | E | 8 | 2 | C | 6 | B0 | A | 4 | E | 8 |
| 7/10 | 7 | 1 | B | 5 | F | 9 | 3 | D | 7 | 1 | B | 5 | F | 9 | 3 | D | 7 | 1 | B | 5 | F | 9 |
| 8/10 | 8 | 2 | C | 6 | 30 | A | 4 | E | 8 | 2 | C | 6 | 80 | A | 4 | E | 8 | 2 | C | 6 | D0 | A |
| 9/10 | 9 | 3 | D | 7 | 1 | B | 5 | F | 9 | 3 | D | 7 | 1 | B | 5 | F | 9 | 3 | D | 7 | 1 | B |

FIG. 13(d)

| Tv | 2s | 1s | ½ | ¼ | ⅛ | 1/15 | 1/30 | 1/60 | 1/125 | 1/250 | 1/500 | 1/1000 | (sec) |
|---|---|---|---|---|---|---|---|---|---|---|---|---|---|
|  | -1 | 0 | 1 | 2 | 3 | 4 | 5 | 6 | 7 | 8 | 9 | 1.0 | APEX VALUE |
| 0/10 | 00 | A | 4 | E | 8 | 2 | C | 6 | 50 | A | 4 | E |  |
| 1/10 | 1 | B | 5 | F | 9 | 3 | D | 7 | 1 | B | 5 | F |  |
| 2/10 | 2 | C | 6 | 20 | A | 4 | E | 8 | 2 | C | 6 | 70 |  |
| 3/10 | 3 | D | 7 | 1 | B | 5 | F | 9 | 3 | D | 7 | 1 |  |
| 4/10 | 4 | E | 8 | 2 | C | 6 | 40 | A | 4 | E | 8 | 2 |  |
| 5/10 | 5 | F | 9 | 3 | D | 7 | 1 | B | 5 | F | 9 | 3 |  |
| 6/10 | 6 | 10 | A | 4 | E | 8 | 2 | C | 6 | 60 | A | 4 |  |
| 7/10 | 7 | 1 | B | 5 | F | 9 | 3 | D | 7 | 1 | B | 5 |  |
| 8/10 | 8 | 2 | C | 6 | 30 | A | 4 | E | 8 | 2 | C | 6 |  |
| 9/10 | 9 | 3 | D | 7 | 1 | B | 5 | F | 9 | 3 | D | 7 |  |

FIG. 13(e)

| Av | 1.0 | 1.4 | 2 | 2.8 | 4 | 5.6 | 8 | 11 | 16 | 22 | STOP(F VALUE) |
|---|---|---|---|---|---|---|---|---|---|---|---|
|  | 0 | 1 | 2 | 3 | 4 | 5 | 6 | 7 | 8 | 9 | APEX VALUE |
| 0/10 | 00 | A | 4 | E | 8 | 2 | C | 6 | 50 | A |  |
| 1/10 | 1 | B | 5 | F | 9 | 3 | D | 7 | 1 | B |  |
| 2/10 | 2 | C | 6 | 20 | A | 4 | E | 8 | 2 | C |  |
| 3/10 | 3 | D | 7 | 1 | B | 5 | F | 9 | 3 | D |  |
| 4/10 | 4 | E | 8 | 2 | C | 6 | 40 | A | 4 | E |  |
| 5/10 | 5 | F | 9 | 3 | D | 7 | 1 | B | 5 | F |  |
| 6/10 | 6 | 10 | A | 4 | E | 8 | 2 | C | 6 | 60 |  |
| 7/10 | 7 | 1 | B | 5 | F | 9 | 3 | D | 7 | 1 |  |
| 8/10 | 8 | 2 | C | 6 | 30 | A | 4 | E | 8 | 2 |  |
| 9/10 | 9 | 3 | D | 7 | 1 | B | 5 | F | 9 | 3 |  |

F I G. 18

| T(EV) FRACTION PORTION | CALCULATED VALUE | PROGRAM SET VALUE | SHUTTER MODE BIT | | | | |
|---|---|---|---|---|---|---|---|
| | | | 1000 | 500 | 250 | 125 | 63 |
| 0/10 | (2000ms) | (2000ms) | 1 | 1 | 1 | 1 | 1 |
| 1/10 | 1866ms | 1875ms | 1 | 1 | 1 | 1 | 0 |
| 2/10 | 1741ms | 1750ms | 1 | 1 | 1 | 0 | 0 |
| 3/10 | 1625ms | 1625ms | 1 | 1 | 0 | 1 | 0 |
| 4/10 | 1516ms | 1500ms | 1 | 1 | 0 | 0 | 0 |
| 5/10 | 1414ms | 1375ms | 1 | 0 | 1 | 1 | 0 |
| 6/10 | 1316ms | 1250ms | 1 | 0 | 1 | 0 | 0 |
| 7/10 | 1231ms | 1188ms | 1 | 0 | 0 | 1 | 1 |
| 8/10 | 1148ms | 1125ms | 1 | 0 | 0 | 1 | 0 |
| 9/10 | 1071ms | 1063ms | 1 | 0 | 0 | 0 | 1 |
| 10/10 | 1000ms | 1000ms | 1 | 0 | 0 | 0 | 0 |

FIG. 20

| SHUTTER SECOND BEFORE CHANGE | SHUTTER MODE | | | | BEFORE CORRECTION | AFTER CORRECTION |
|---|---|---|---|---|---|---|
| | 2 | 1 | 0.5 | 0.25 | Tv CODE | Tv CODE |
| 1 + 9/10 ms | 0 | 1 | 0 | 0 | 6E | 6E |
| 1/10 | 0 | 1 | 0 | 0 | 6D | 6E |
| 2/10 | 0 | 1 | 0 | 0 | 6C | 6E |
| 3/10 | 0 | 1 | 0 | 0 | 6B | 6E |
| 4/10 | 0 | 1 | 0 | 1 | 6A | 6A |
| 5/10 | 0 | 1 | 0 | 1 | 69 | 6A |
| 6/10 | 0 | 1 | 1 | 0 | 68 | 68 |
| 7/10 | 0 | 1 | 1 | 0 | 67 | 68 |
| 8/10 | 0 | 1 | 1 | 1 | 66 | 66 |
| 9/10 | 0 | 1 | 1 | 1 | 65 | 66 |
| 2 + 9/10 ms | 1 | 0 | 0 | 0 | 64 | 64 |
| 1/10 | 1 | 0 | 0 | 0 | 63 | 64 |
| 2/10 | 1 | 0 | 0 | 1 | 62 | 62 |
| 3/10 | 1 | 0 | 0 | 1 | 61 | 62 |
| ---- | ---- | ---- | ---- | ---- | ---- | ---- |
| | | | | | | |
| 4/10 | 1 | 0 | 1 | 0 | 60 | 60 |
| 5/10 | 1 | 0 | 1 | 1 | 5F | 5F |
| 6/10 | 1 | 1 | 0 | 0 | 5E | 5E |
| 7/10 | 1 | 1 | 0 | 1 | 5D | 5D |
| 8/10 | 1 | 1 | 1 | 0 | 5C | 5C |
| 9/10 | 1 | 1 | 1 | 1 | 5B | 5B |

FIG. 26

| INPUT MODE \ TAKING MODE | M | M | M | M | A | EF1 | EF2 | EF1 | B | B | B | B | B | EF1 | EF2 | EF1 |
|---|---|---|---|---|---|---|---|---|---|---|---|---|---|---|---|---|
| EF1 SIGNAL | 0 | 1 | 0 | 1 | 0 | 1 | 0 | 1 | 0 | 1 | 0 | 1 | 0 | 1 | 0 | 1 |
| EF2 SIGNAL | 0 | 0 | 1 | 1 | 0 | 0 | 1 | 1 | 0 | 0 | 1 | 1 | 0 | 0 | 1 | 1 |
| AM SIGNAL | 0 | 0 | 0 | 0 | 1 | 1 | 1 | 1 | 0 | 0 | 0 | 0 | 1 | 1 | 1 | 1 |
| B SIGNAL | 0 | 0 | 0 | 0 | 0 | 0 | 0 | 0 | 1 | 1 | 1 | 1 | 1 | 1 | 1 | 1 |
| St SIGNAL | 0 | 0 | 0 | 0 | 0 | 0 | 0 | 0 | 0 | 0 | 0 | 0 | 0 | 0 | 0 | 0 |

| INPUT MODE \ TAKING MODE | St→M | St→M | St→M | St→M | St→A | St→EF1 | St→EF2 | St→EF1 | B | B | B | B | B | St→EF1 | St→EF2 | St→EF1 |
|---|---|---|---|---|---|---|---|---|---|---|---|---|---|---|---|---|
| EF1 SIGNAL | 0 | 1 | 0 | 1 | 0 | 1 | 0 | 1 | 0 | 1 | 0 | 1 | 0 | 1 | 0 | 1 |
| EF2 SIGNAL | 0 | 0 | 1 | 1 | 0 | 0 | 1 | 1 | 0 | 0 | 1 | 1 | 0 | 0 | 1 | 1 |
| AM SIGNAL | 0 | 0 | 0 | 0 | 1 | 1 | 1 | 1 | 0 | 0 | 0 | 0 | 1 | 1 | 1 | 1 |
| B SIGNAL | 0 | 0 | 0 | 0 | 0 | 0 | 0 | 0 | 1 | 1 | 1 | 1 | 1 | 1 | 1 | 1 |
| St SIGNAL | 1 | 1 | 1 | 1 | 1 | 1 | 1 | 1 | 1 | 1 | 1 | 1 | 1 | 1 | 1 | 1 |

FIG. 27

| (RAM $03) | | | | | | | | (RAM $04) | | | | | | | |
|---|---|---|---|---|---|---|---|---|---|---|---|---|---|---|---|
| BIT | 7 | 6 | 5 | 4 | 3 | 2 | 1 | 0 | 7 | 6 | 5 | 4 | 3 | 2 | 1 | 0 |
| | * | St | EF1 | EF2 | B | AM | * | * | * | * | * | AEL | * | * | * | * |

(RAM $0A) ⇓

| BIT | 7 | 6 | 5 | 4 | 3 | 2 | 1 | 0 |
|---|---|---|---|---|---|---|---|---|
| | * | * | AEL | B | St | A | EF2 | EF1 |

| | INDICATION MODE | L1 | L2 | L3 | MLED |
|---|---|---|---|---|---|
| BCI=0 | PROPER | 0 | 1 | 0 | 0 |
| | HIGH BRIGHTNESS | 1 | 0 | 0 | 0 |
| | LOW BRIGHTNESS | 0 | 0 | 1 | 0 |
| | MANUAL | 0 | 0 | 0 | f |
| BCI=1 | PROPER | f | 1 | f | 0 |
| | HIGH BRIGHTNESS | 1 | 0 | f | 0 |
| | LOW BRIGHTNESS | f | 0 | 1 | 0 |
| | MANUAL | f | 0 | f | f |

FIG. 35-I
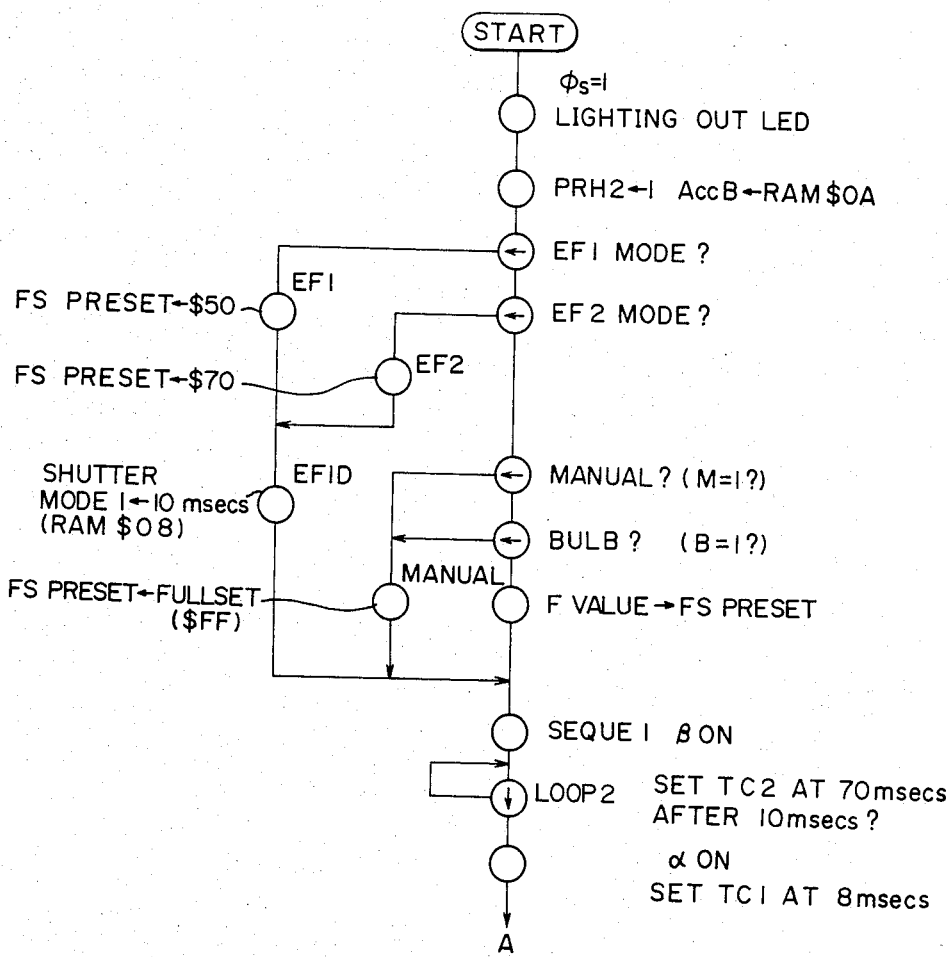

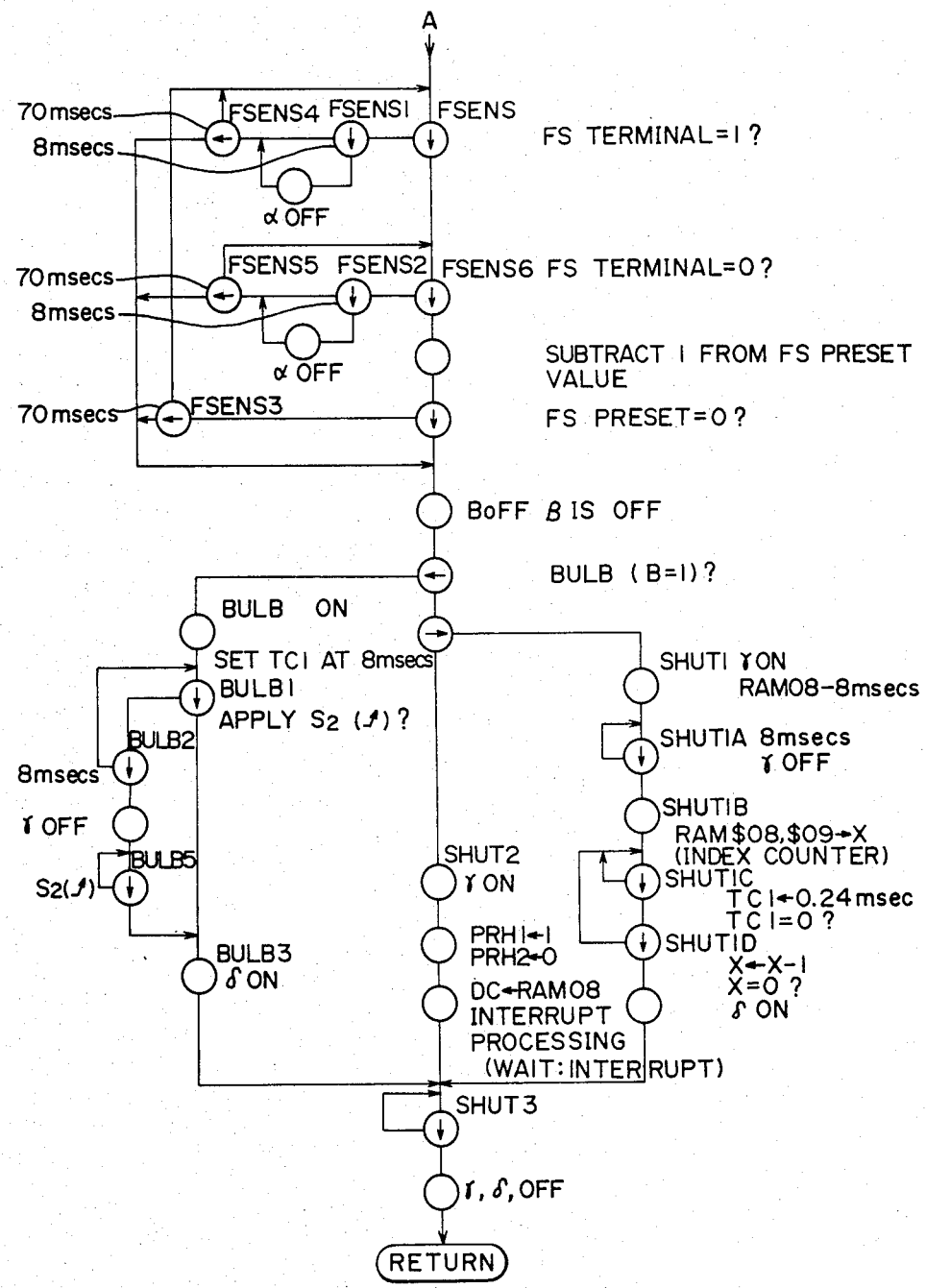
FIG. 35-II

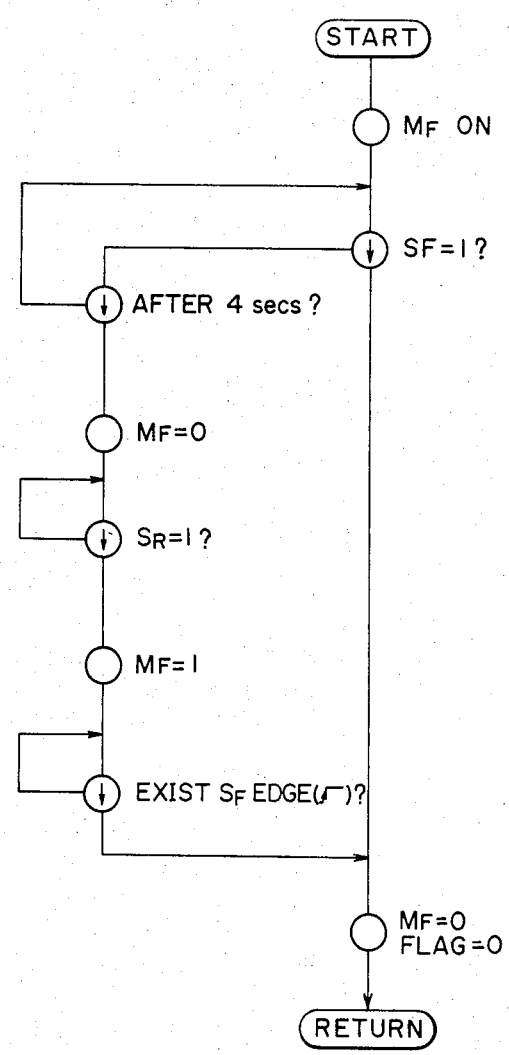
F I G. 37

FIG. 38-I

| NO | ADDRESS | COMMAND CODE | BRANCH NAME | MNEMONIC | OPERAND | COMMENTS |
|---|---|---|---|---|---|---|
| 00001 | 3008 |  |  | ORG | $3008 |  |
| 00002 | 3008 | B6 0C | START | LDA A | $0C | PRH 1=1? |
| 00003 | 300A | 85 04 |  | BIT A | #$04 |  |
| 00004 | 300C | 26 07 |  | BNE | PRH1 |  |
| 00005 | 300E | 85 02 |  | BIT A | #$02 | PRH 2=1? |
| 00006 | 3010 | 26 11 |  | BNE | $ET2 |  |
| 00007 | 3012 | 7E 3043 |  | JMP | PRH0 | TO PRH 0 |
| 00008 | 3015 | B6 13 | PRH1 | LDA A | $13 | SEQUENCE DATE |
| 00009 | 3017 | B7 E106 |  | STA A | $E106 |  |
| 00010 | 301A | B6 0D |  | LDA A | $0C | PRH 2: CLEAR |
| 00011 | 301C | 84 FD |  | AND A | #$FD |  |
| 00012 | 301E | B7 0D |  | STA A | $0C |  |
| 00013 | 3020 | 7E 30A4 |  | JMP | CAIEN |  |
| 00014 | 3023 | B6 14 | SET2 | LDA A | $14 |  |
| 00015 | 3025 | 84 EE |  | AND A | #$FE |  |
| 00016 | 3027 | B7 E108 |  | STA A | $E108 |  |
| 00017 | 302A | C6 08 |  | LDA B | #$08 | DC=0.25 MSEC SET |
| 00018 | 302C | F7 E107 |  | STA B | $E107 |  |
| 00019 | 302F | 8A 01 |  | ORA A | #$01 |  |
| 00020 | 3031 | B7 E108 |  | STA A | $E108 |  |
| 00021 | 3034 | B6 0F | PRH2 | LDA A | $0F | TC 1=0 ? |
| 00022 | 3036 | 27 02 |  | BEQ | CAI3 |  |
| 00023 | 3038 | 7A 0F |  | DEC | $0F |  |
| 00024 | 303A | B6 10 | CAI3 | LDA A | $10 | TC 2=0 ? |
| 00025 | 303C | 27 02 |  | BEQ | DUM |  |
| 00026 | 303E | 7A 10 |  | DEC | $10 |  |
| 00027 | 3040 | 7E 30A4 | DUM | JMP | CAIEN | TO RTI |
| 00028 | 3043 | B6 14 | PRH0 | LDA A | $14 |  |
| 00029 | 3045 | 84 FE |  | AND A | #$FE |  |
| 00030 | 3047 | B7 E108 |  | STA A | $E108 |  |
| 00031 | 304A | C6 40 |  | LDA B | #$40 | DC=2 MSEC SET |
| 00032 | 304C | F7 E107 |  | STA B | $E107 |  |
| 00033 | 304F | 8A 01 |  | ORA A | #$01 |  |
| 00034 | 3051 | B7 E108 |  | STA A | $E108 |  |
| 00035 | 3054 | B7 14 |  | STA A | $14 |  |
| 00036 | 3056 | B6 E103 |  | LDA A | $E103 | ADE BIT=1? 3LT |
| 00037 | 3059 | 46 |  | ROR A |  |  |

FIG. 38-II

| NO | ADDRESS | COMMAND CODE | BRANCH NAME | MNEMONIC | OPERAND | COMMENTS |
|---|---|---|---|---|---|---|
| 00038 | 305A | 25 13 | | BCS | CAI1 | |
| 00039 | 305C | B6 E104 | | LDA A | $E104 | ADC OUT->RAM $2002 |
| 00040 | 305F | B7 02 | | STA A | $02 | ($2002:WORKING AREA) |
| 00041 | 3061 | B6 14 | | LDA A | $14 | |
| 00042 | 3063 | 8A 02 | | ORA A | #$02 | ⎫ |
| 00043 | 3065 | B7 E108 | | STA A | $E108 | ⎬ A/D START |
| 00044 | 3068 | 84 FD | | AND A | #$FD | ⎭ |
| 00045 | 306A | B7 E108 | | STA A | $E108 | |
| 00046 | 306D | B7 14 | | STA A | $14 | |
| 00047 | 306F | B6 11 | CAI1 | LDA A | $11 | DA=0? |
| 00048 | 3071 | 84 03 | | AND A | #$03 | |
| 00049 | 3073 | 27 20 | | BEQ | DA0 | |
| 00050 | 3075 | 4A | | DEC A | | DA=1? |
| 00051 | 3076 | 27 13 | | BEQ | DA1 | |
| 00052 | 3078 | 4A | | DEC A | | DA=2? |
| 00053 | 3079 | 27 08 | | BEQ | DA2 | |
| 00054 | 307B | B6 E100 | DA3 | LDA A | $E100 | DA=3 |
| 00055 | 307E | B7 03 | | STA A | $03 | MODE INPUT(DAT 1) |
| 00056 | 3080 | 7E 3090 | | JMP | DAEN | |
| 00057 | 3083 | B6 E101 | DA2 | LDA A | $E101 | |
| 00058 | 3086 | B7 04 | | STA A | $04 | MODE INPUT(DAT 2) |
| 00059 | 3088 | 7E 3090 | | JMP | DAEN | |
| 00060 | 308B | B6 E102 | DA1 | LDA A | $E102 | ASA AND F0 INPUT(ASF) |
| 00061 | 308E | B7 15 | | STA A | $15 | |
| 00062 | 3090 | 7A 11 | DAEN | DEC | $11 | DA=DA-1 |
| 00063 | 3092 | 7E 309C | | JMC | CAI2 | |
| 00064 | 3095 | BD 2300 | DA0 | JSR | $2300 | TO CFT SUBROUTINE |
| 00065 | 3098 | 86 03 | | LDA A | #$03 | DA=3 SET |
| 00066 | 309A | B7 11 | | STA A | $11 | |
| 00067 | 309C | B6 12 | CAI2 | LDA A | $12 | LED DISPLAY DATE BYTE |
| 00068 | 309E | B7 E105 | | STA A | $E105 | |
| 00069 | 3101 | 7E 3034 | | JMP | PRH2 | |
| 00070 | 3104 | B7 E10F | CAIEN | STA A | $E10F | IRQ:CLEAR |
| 00071 | 3107 | 3B | | RTI | | |
| 00072 | | | | END | | |

CAMERA WITH MICROPROCESSOR

BACKGROUND OF THE INVENTION

1. Field of the Invention

The present invention relates to a camera having a microprocessor mounted therein and, more particularly, to a camera which is equipped with such a control system as is made highly cooperative with a variety of external inputs, set inputs and so on by efficiently effecting the interrupt processings of the microprocessor.

2. Description of the Prior Art

In recent years, a camera has given its taker a variety of conveniences. In other words, the camera has had multiple functions and allowed even a beginner to make excellent photography with ease. The camera has become remarkably convenient because the operations which have been manually conducted by the taker himself, e.g., the automatic exposure control, the strobo phototgraphy control, the automatic film loading or the automatic film winding are automated. However, since the aforementioned respective automated functions have been controlled independently of one another, the camera has to be equipped with the more complex control circuit as the number of the functions becomes the more. It is sure that even if a custom IC is mounted in the camera so that the control circuit may be integrated there arises a limit to the capacity of the custom IC.

However, a very small-sized microprocessor having arithmetic functions has been developed, and a microprocessor in which memory means, an input/output interface circuit or the like and a central processing unit (which will be shortly referred to merely as a "CPU") are integrated in one chip has been produced and mounted in an electric device or another device.

SUMMARY OF THE INVENTION

It is, therefore, an object of the present invention to provide an easily operable camera system which has its those microprocessors so efficiently controlled that the respectively functions may be organically constructed.

BRIEF DESCRIPTION OF THE DRAWINGS

Other objects and features of the present invention will be made apparent from the following description taken with reference to the accompanying drawings, in which:

FIG. 10 shows an example of an RAM map for indicating the stored states of various pieces of information in an RAM used in the present invention;

FIGS. 13(a) to 13(e) are conversion tables of ASA values and Fo values into arithmetic code values and show these various arithmetic code values of the shutter speed (in secs), the F-number and the object brightness;

FIGS. 18 and 19 are, respectively, a shutter mode conversion table tabulating the five bits of a shutter mode for each 1/10 EV and a flow chart of an SMC subroutine for effecting the shutter mode conversions;

FIGS. 20 and 21 are, respectively, a conversion table tabulating the shutter second codes in each shutter second and the codes after the conversions into the exposures and a flow chart of the exposure conversion subroutine for effecting said exposure conversions;

FIG. 35 is a flow chart showing the subroutine for effecting a taking mode conversion;

FIG. 26 is a taking mode priority conversion table which is prepared on the basis of the taking mode conversion routine shown in FIG. 25;

FIG. 27 is a table indicating that the taking mode is set from the mode information in the addresses $03 and $04 of the RAM map in an RAM$OA on the basis of the aforementioned priority conversion table;

FIGS. 35-I and II are flow charts showing the details of the sequence control routine of FIG. 6;

FIG. 37 is a flow chart showing a film feed subroutine;

FIGS. 38-I and II are a table tabulating one example of the program which has been prepared in conformity to the interrupt processing flow chart shown in FIG. 7 and used in the present invention.

DESCRIPTION OF THE PREFERRED EMBODIMENTS

The present invention will be described in connection with the embodiment in which the present invention is applied to a single lens reflex camera.

Figure 1:
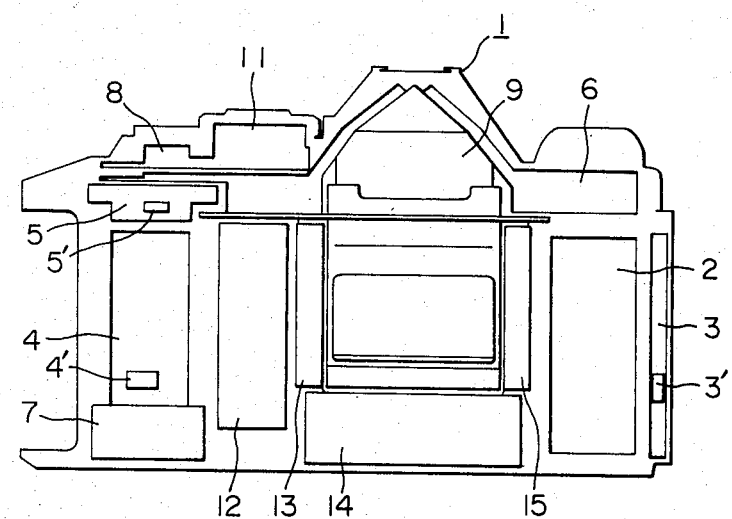
FIG. 1 is a schematic view showing the internal construction of a camera embodying the present invention.

FIG. 1 schematically shows the camera which is used in the embodiment. The following description will be made in accordance with the sequence of a camera 1. First of all, in case the camera 1 is to be loaded with its film, a film loading mechanism 2 is loaded with a film package (although not shown), and a back cover (which is not shown either) is closed. Then, a closure click switch (SB)3' disposed in a back cover hinging portion 3 is biased to feed a microprocessor with a back cover closing signal. The microprocessor runs the film when it receives said back cover closing signal. A counter switch (SC)5', which is disposed in a film counter 5 synchronized with the rotations of the sprocket wheel in a film winding mechanism 4 and which is made operative to restore its initial position thereby to generate an ON signal at the stage wherein the back cover is opened to take out the taken film, is ON in this state so that the microprocessor causes a motor drive circuit 6 to operate a film driving portion 7 thereby to automatically wind up three frames of the film until it is stopped when the counter switch (SC)5' is OFF. Nevertheless, even if the counter switch (SC)5' is rendered inconductive in the course of the winding operation, the film winding drive is continued until a winding switch (SF)4' becomes in conductive in case it is ON. The winding switch (SF)4' abuts against the cam which is made coactive with the rotations of a gear forming a part of the film winding mechanism 4. As a result, if the film is wound up one frame, the aforementioned cam is rotated one rotation so that the switch SF generates an OFF signal. Thus, the film winding drive is stopped when the winding switch SF is rendered inconductive.

Now, when the film loading operation is complete so that the film winding operation, i.e., the idling operation is finished, the preparation for photography is ended. For photographing, a release mechanism 8 having two switches for generating electric signals is first pushed in a soft manner. Then, the first switch $S_1$ (although not shown) is urged to feed said signal to the microprocessor. As a result, this microprocessor controls the reception of photographic information so that the necessary data are displayed in a finder 9 or the like. If the first switch $S_1$ is urged, a photometric circuit is operated so that the analog output of the light-receiving element of the finder 9 is fed through an A/D converter to the microprocessor. As the data of the lens system mounted in the camera 1, open F-number information is fed in the form of three-bit digital information in accordance with the position of a pin attached to the lens system by the action of input means, which is constructed of three sliding members made movable on the three-bit pattern in the body in accordance with the movement of said lens pin, thus providing the input information for exposure arithmetic.

The proper exposure is calculated from the analog input coming from the output of the aforementioned photometric circuit, the aforementioned open F-number information and an ASA value to be described hereinafter. After that, the LED in the finder 9 is used to light the display for informing the proper, high or low brightness or the like. Moreover, the finder 9 is also constructed to perform not only the warning display by the LED so as to obviate the case, in which a serious trouble is caused in the film winding capacity or another function as a result that reduction in the power source voltage is detected, but also an A/M mode display in a distinct manner by means of the LED so as to allow the operator to confirm the photographic mode.

When the first switch $S_1$ is urged by the soft push of the aforementioned release mechanism 8, the main power is supplied to the peripheral circuit of the microprocessor, thus ending the preparation for operating both a magnet for driving the shutter and a motor for driving a mirror and a stop. Moreover, if the release is pushed to urge the second switch $S_2$ of the release mechanism 8, the microprocesssor stops the operation of the photometric circuit, the photometric calculation based upon the output of said photometric circuit and the operations of the displays in the finder 9 and starts a series of exposure control sequences.

Indicated at numeral 11 in FIG. 1 is an ASA setting member for generating a digital value in cooperation with the dial which is manually operated to feed the film sensitivity to the camera. Numerals 12 and 13 indicate shutter mechanism and a stop control mechanism, respectively. Numeral 14 indicates a mirror box charging mechanism for returning the mirror box to its initial position by means of a micromotor. Numeral 15 indicates a mirror driving mechanism for popping up the mirror by the force of a mirror-up spring when a release magnet 18 (as better seen from FIG. 2) is energized.

Figure 2:
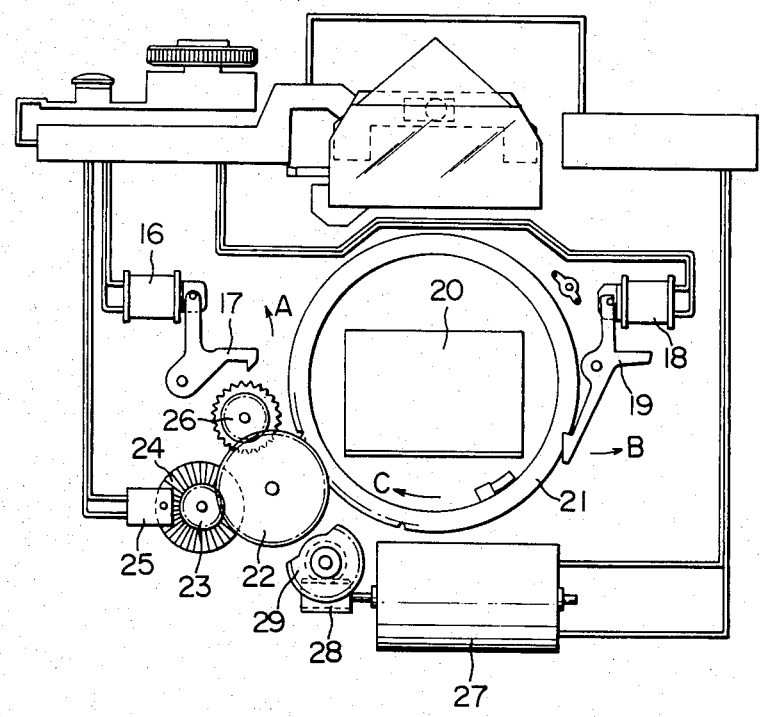
FIG. 2 is a view showing an essential portion of an aperture controlling mechanism of the camera of FIG. 1.

Next, the exposure control mechanism will be described with reference to FIG. 2. A stop magnet 16 rotates a stop pawl 17 in the direction of arrow A whereas the release magnet 18 releases the attraction of a hook lever 19 and rotates it in the direction of arrow B. This hook lever 19 partly pops up a mirror 20 and partly releases the retention of a stop ring 21 so that the stop ring 21 begins to rotate in the direction of arrow C. The rotations of that stop ring 21 are transmitted to a stop detecting gear 22 and further to an F-sensor gear 23 at an augmented speed. This F-sensor is constructed of an F-sensor Siemens' star 24, which is formed with a number of slits and a photo-coupler 25 which is composed of a pair of LEDs and a phototransistor. Since the F-sensor gear 23 and the F-sensor Siemens' star 24 are in meshing engagement with each other, the lights of the LEDs give the phototransistor flashing light rays in accordance with the rotations of the F-sensor gear 23. As a result, the rotation or rotations of the stop ring 21 is given as information of the pulse number to the phototransistor so that the rotational information of the stop ring 21 is imparted as an electric signal to the microprocessor.

The microprocessor always judges whether or not the stop ring 21 has rotated to the proper stop value which is determined by the exposure calculation and stored, as has been described in the above, and interrupts the power supply to the stop magnet 16, when the proper stop value is reached, to retain a stop ratchet wheel 26 on the stop pawl 17 thereby to stop the rotations of the stop detecting gear 22 meshing with the stop ratchet wheel 26 and accordingly of the stop ring 21 meshing with the stop detecting gear 22.

After the proper stop value has been set, as has been described in the above, the microprocessor feeds a front curtain retaining magnet (although not shown) with a shutter front curtain start signal so that the running operation of the front curtain is started. Moreover, the microprocessor operates a timer disposed therein after the front curtain start signal has been generated. When the proper shutter time (i.e., the proper exposure time) which has been predetermined by the exposure calculation, the microprocessor feeds a rear curtain retaining magnet (although not shown) with a rear curtain start signal thereby to start the running operation of the rear curtain. As a result, the exposure of the film to the light of the object is ended at the proper stop value and at the proper shutter time value.

For the subsequent shot, the microprocessor generates a rear curtain signal and rotates a mirror box motor 27 and further a tooth-removed gear 29 for stop drive through a worm 28 thereby to rotate the stop ring 21 in the opposite direction to that of the arrow C through the stop detecting gear 22 until the latter is returned to its initial position and retained by means of the hook lever 19.

Moreover, the tooth-removed gear 29 for stop drive rotates partly to return the mirror through a mirror supporting fixture and a mirror fixing spring (although both are not shown) and partly to allow the shutter to restore its initial position by the action of a shutter charge member (although not shown).

After the foregoing mechanical operations, i.e., the mirror returning operation and the shutter charging operation, the microprocessor generates a signal for winding up one frame of the film so that the film winding device is effected by the motor drive circuit to wind up the film by one frame. The confirmation of the fed length of the film is performed through the signal of the aforementioned winding switch SF.

The description thus far made is directed to the fundamental operations of the camera embodying the present invention. The respective operations are all controlled by the microprocessor. In addition, this microprocessor performs all the judgements and exposure calculations of the camera operations thereby to improve the precision in the exposure control and promote the uniting operation of the respective mechanisms of the camera while eliminating the mechanical complexness.

The present invention will be described in detail in the following.

Figure 3:
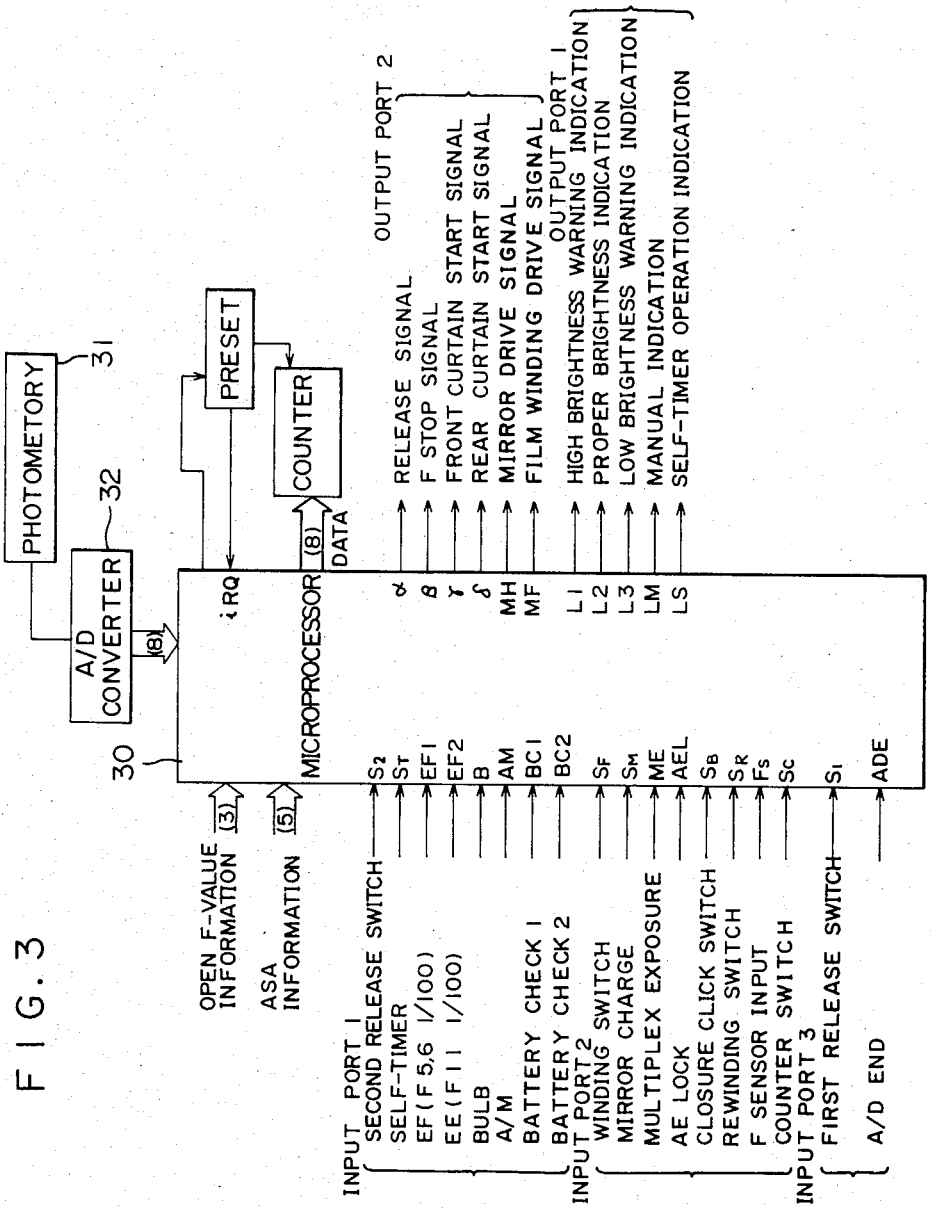
FIG. 3 is a diagram illustrating the input and output information of a microprocessor used in the present invention.

FIG. 3 is a block diagram showing the construction system of a microprocessor 30 and illustrates the relationships between the input and output signals at input and output ports. As the input information, those values of the object brightness by a photometric circuit 31, which have been converted into digital values by an A/D converter 32, the open F-number and the film sensitivity (i.e., the ASA value) are fed in binary values of eight, three and five bits, respectively. The microprocessor is further fed with pieces of information FF1, FF2, B, AM and ST for determining the photographic mode, pieces of information $S_1$, $S_2$, SF, SM, ME, AEL, SB, SR, FS and SC for determining the operating state of the camera, and pieces of information BC1 and BC2 for indicating the drop state of the voltage of the battery. As the output information, there are prepared pieces of information $\alpha$, $\beta$, $\gamma$, $\delta$, MM and MF for effecting the operations of the camera, and LED drive output information for displaying whether or not in the proper exposure state, the photographic mode (i.e., whether or not in the automatic, manual or self-timer operation) and the state of the battery.

Of the input and outputs illustrated in FIG. 3, as the information to be determined by the operator himself:

a signal FF1 is a signal for setting the exposure state at a shutter speed of 1/100 sec and in F=5.6 for the strobo photography;

a signal FF2 is a signal for setting the exposure state at the shutter speed of 1/100 sec and in F=11;

a signal B is a signal indicative of the bulb photography, whereupon the stop can be arbitrarily set so that the rear curtain is run if the shutter mechanism has its second release switch $S_2$ (which will be described hereinafter) turned OFF;

a signal AM is a signal for switching the setting between the automatic exposure control photography and the manual photography so that the automatic exposure control photograpy is conducted for ON; and a signal ST is a signal for setting the self-timer photography so that the timer operation is started for ON whereas the usual photography is conducted for ON. Said signal ST is effective only when the later-described signals $S_1$ and $S_2$ are ON.

In response to those signals, the photographic mode is determined. As in the signal assignment table of the RAM (which will be called hereinafter as the "RAM map") in the CPU shown in FIG. 10, more specifically, the respective signals ST, EF1, EF2, B, AM and AEL are stored in the addresses 03 and 04 of the RAM and are converted into such an arrangement as is tabulated in the address OA of the RAM.

Next, as the signals for determining the operations of the camera:

a signal $S_1$ is a switch signal at the first step of the release and plays a role to start the photometry;

a signal $S_2$ is a switch signal at the second step of the release and plays a role to start the sequence control;

a switch SF is a winding switch which is operative to generate such a signals as is OFF when the film has been wound one frame and ON when in the winding operation;

a signal SM is a signal which is ON when neither the mirror nor the shutter is not returned by the mirror-shutter charge switch and OFF when the charge (i.e., the returning operation to the initial position) is finished;

a signal ME is a multiplex exposure signal which effects the mirror-shutter charge, if it is ON in case multiple shots are made on one frame of the film, to interrupt the film feeding operation thereby to prepare the subsequent photography;

a signal AEL is an automatic exposure control lock signal for locking the exposure level at the time when it is ON, i.e., the value T (i.e., the shutter speed) determined by the object or the like and the value F (i.e., the stop level) so that the second release switch signal $S_2$ effects the sequence control, if it is ON with said T and F values left as they are, with the aforementioned values T and F even for an object having different brightness. Said AEL signal is one of the pieces of information for determining the aforementioned photographic mode;

a switch SB is a click switch which is made operative to generate a signal informing whether the back cover to be opened and closed for replacing the film or the like is opened or closed and which is turned ON if it is opened;

a switch SR is a rewinding switch which can invite the rewinding sequence if it is turned ON;

an input FS is the input pulses from the F sensor, the number of which is counted to generate data for stop control in accordance with the counted value; and a switch SC is a film counter switch which is so constructed that it is kept ON until three frames of the film are idly reached, when the film is idly fed three frames after the camera has been loaded with the film and after the back cover has been closed.

Moreover, as the signals for introducing the voltage drop state of the battery for the information informing the operator of the operating state of the camera into the microprocessor, there are battery check signals BC1 and BC2, of which:

the signal BC1 is a signal for informing that the voltage has dropped to such a level as is required to warn the battery replacement; and the signal BC2 is a signal for informing that the voltage has dropped to such a level as is required to prohibit the start of the sequence of the camera.

Next, of the pieces of information required to operate the camera in accordance with the arithmetic of the microprocessor:

a signal $\alpha$ is a signal for releasing the stop ring from being retained;

a signal $\beta$ is a signal for starting the counting operation of the F-sensor information for the stop control;

a signal $\gamma$ is a signal for starting the front curtain of the shutter; and a signal $\delta$ is a signal for starting the rear curtain of the shutter.

Moreover:

a signal MM is a signal for driving a motor for mirror and shutter charges; and a signal MF is a signal for driving a film feeding motor.

Moreover, as the drive signal of the display unit for the display to allow the operator to confirm the exposure state, the state of the self-timer operation and so on, there are the following signals:

a signal L1 is a signal for the display of a high brightness warning;

a signal L2 is a signal for the display of the proper brightness (or the proper exposure) state;

a signal L3 is a signal for the display of a low brightness warning; and a signal LS is a signal for driving the display unit to display the operating state of the self-timer such that it flashes in 2 Hz 0 to 4 seconds after the setting, in 4 Hz 4 to 8 seconds thereafter, and in 8 Hz 8 to 10 seconds thereafter.

Here, the time period from the time the self-timer is set to the time the shutter is clicked and the flashing frequencies may naturally resort to different methods. A further effect can be obtained at this time if there is adopted in addition to the flashing display unit means for driving a small-sized piezoelectric buzzer such as a piezoelectric element thereby to allow the operator, which is to be photographed, to sense not only visually but also auditorily or to be informed of the operating state of the self-timer. A signal LM is a signal for the display of the manual warning and for taking a value 1 to emit a light in case the manual mode is selected.

It is quite natural that the displays L1 to LM in the finder thus far described can be made by means of a liquid crystal or the like in addition to the LEDs.

Figure 4:
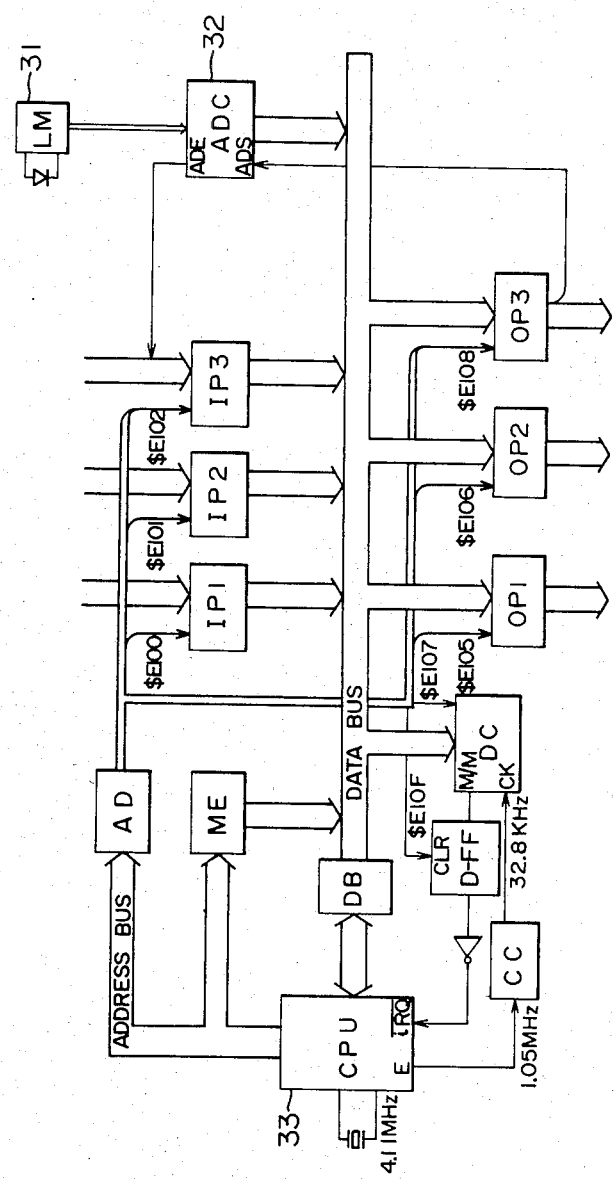
FIG. 4 is a block diagram showing the internal construction of the microprocessor used in the present invention.

In the example used in the present invention, the CPU and the peripheral circuit constituting together the microprocessor are constructed, as shown in FIG. 4, of: a central processing unit (CPU) 33, which is a product HD46802 of Hitachi Ltd., as the central unit; and an external read only memory (ROM) ME, three eight-bit buffers IP1 to IP3 for feeding an external input to the data bus of the CPU 33, three eight-bit D flip-flops OP1 to OP3 for feeding out the information as an external output out of said data bus, an address decoder AD for assigning the addresses of those inputs and outputs, a down counter DC for effecting the assignment of the microprocessor, the A/D converter 32 for converting the external analog input into a digital input, and a data buffer DB for relaying the input and output data and the CPU 33.

The aforementioned central processing unit (CPU) HC46802 is enabled to execute seventy two kinds of instructions such as binary arithmetic, decimal correction, logic arithmetic, shifting, rotating, loading, storing, branching, interrupting or stacking operations. Moreover, the central processing unit has a random access memory RAM of 128 bits built therein.

Now, the following description is directed to the embodiment in which the several conditions of the camera are organically constructed by the efficient control of said microprocessor the present invention aims at.

Figure 5:
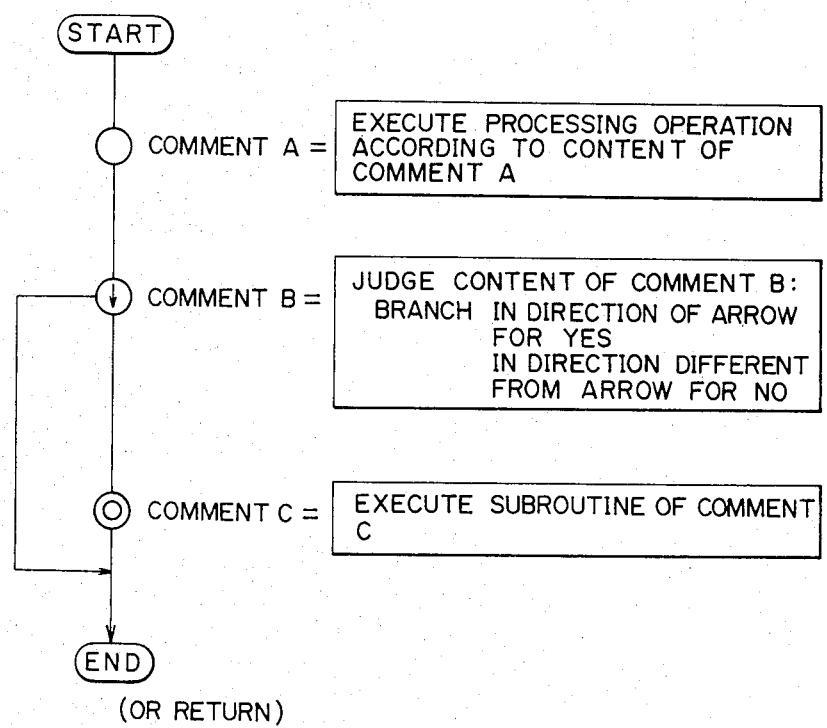
FIG. 5 is a chart displaying the determinations of a flow chart for describing the present invention in the following.
Figure 6:
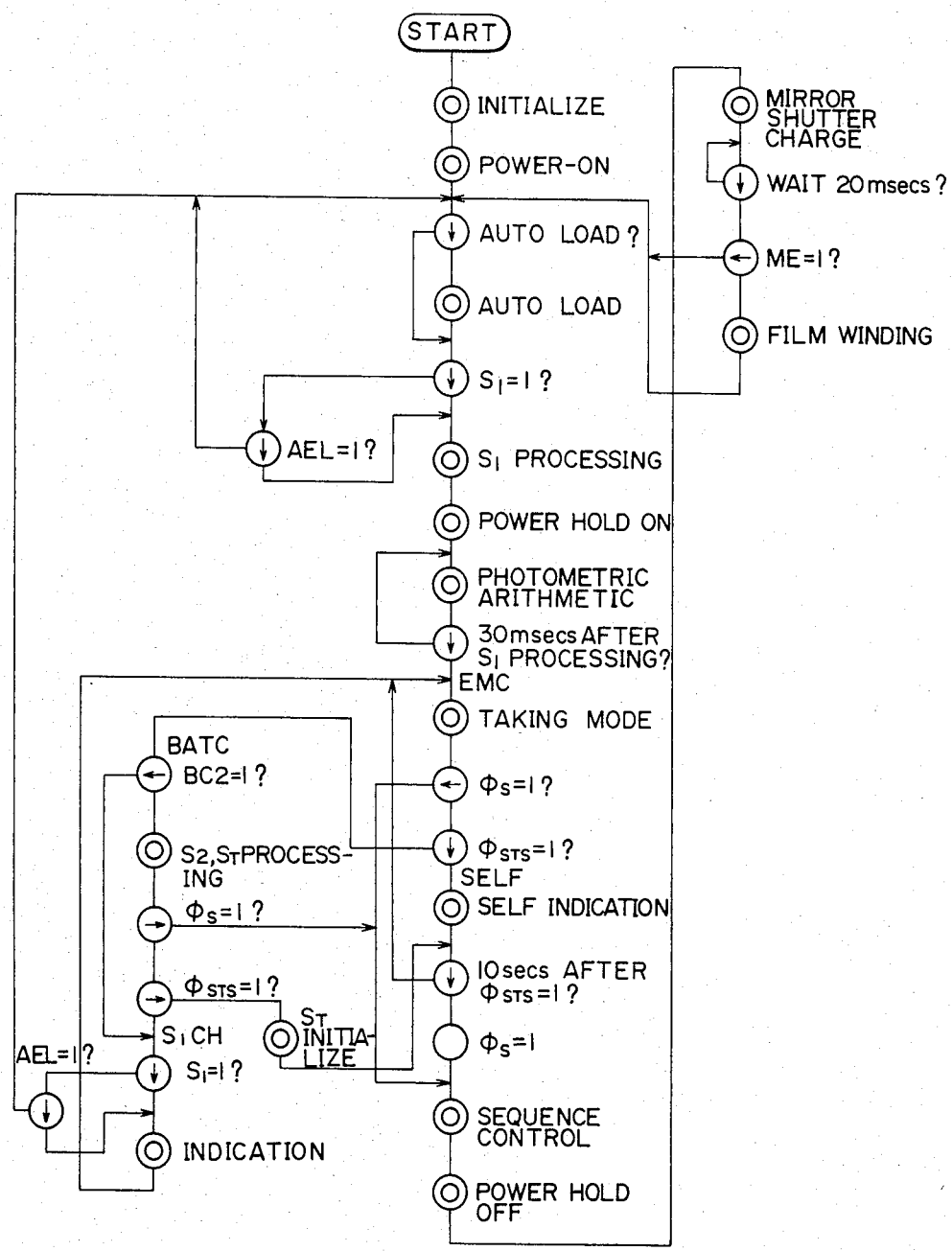
FIG. 6 is a flow chart showing a main program portion for controlling the camera embodying the present invention.

The display type of the flow chart to be used for describing the operations is shown in FIG. 5, and the flow chart schematically illustrating the control sequence of the camera according one embodiment of the present invention is shown in FIG. 6.

Flags will be described in the following although the detailed description of the flow chart of FIG. 6 will be made hereinafter.

A flag $\phi_S$ is erected (i.e., $\phi_S=1$), when the switches $S_1$ and $S_2$ are turned ON, thereby to start the execution of the sequence control program. A flag $\phi_{STS}$ is erected (i.e., $\phi_{STS}=1$), when the switches $S_1$, $S_2$ and ST are turned ON, thereby to conduct the control of the self-timer.

Figure 7:
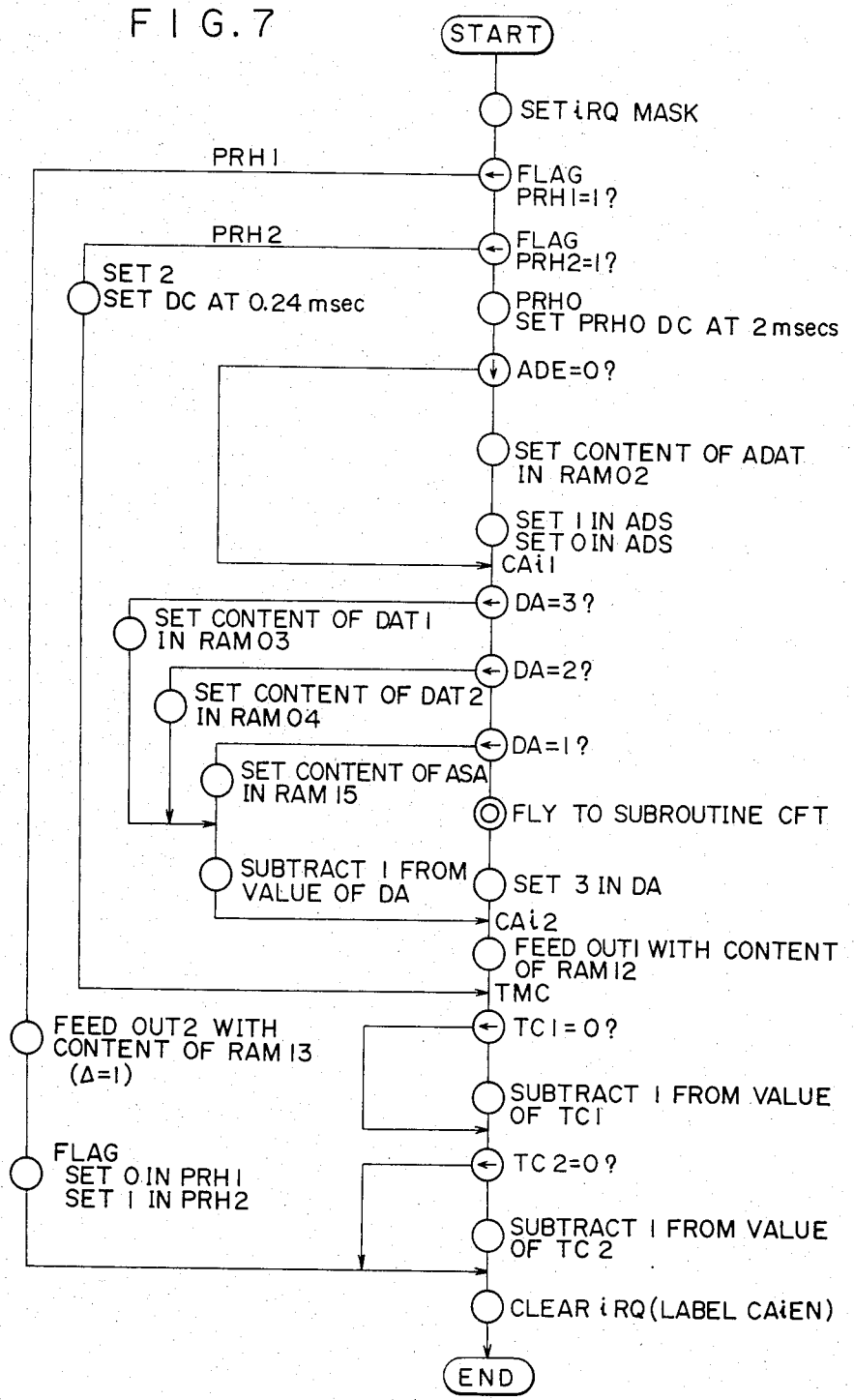
FIG. 7 is a flow chart showing an interrupt processing program used in the present invention.

In the control sequence of the camera in accordance with the present invention, moreover, reference timings for various processings are made by conducting the interruption of the microprocessor each predetermined time along the flow of the sequence in addition to the major operations illustrated in the aforementioned flow charts. The manner of that interruption will be described in the following. Here, FIG. 7 illustrates the flow chart of an interrput request program (which will be called "IRQP" hereinafter). In this IRQP, the flag ADE indicates that the analog input signal has been converted into a digital signal by the A/D converter and has become the input signal of the microprocessor. The remaining flags will be explained in the following description.

In the interruption, the CPU interrupts the usual program which are being executed, if it receives the interrupt signal from the outside during the aforementioned program being executed, and executes a predetermined interrupt program. After the execution of the interrupt processing has been ended, the aforementioned program once interrupted is again continued.

In the microprocessor used during the practice of the present invention, three kinds of interruptions, e.g., the non-maskable interruption, the requirement for the interruption and the software interruption can be used. In the embodiment of the present invention, however, only the interrption requiring system is used to prepare the program.

The CPU partly interrupts the program being executed, when its interrput terminal receives a signal from the outside, if an I flag (which is called such an interrput flag as is erected during the interrupt execution) to make the respective registers take refuge in the stacks, and partly erects the aforementioned I flag to set the program counter in the leading address of the IRQP, which is stored in the addresses FFF8 and 9 of the memory address, thereby to start the execution of the IRQP. After the end of the IRQP, the CPU resets the I flag and returns the stacked registers until it executes again the interrupted program.

Figure 8:
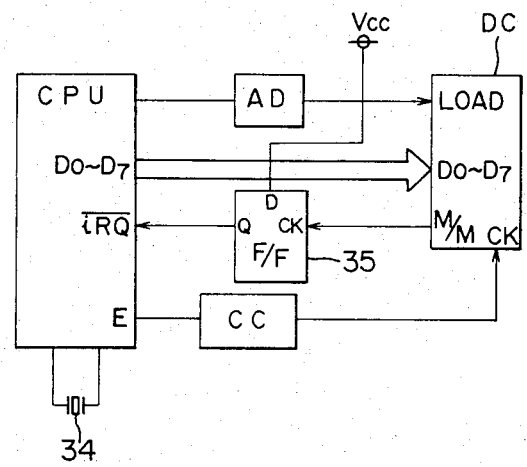
FIG. 8 shows an example of the microprocessor and the peripheral construction such as a frequency divider, an address decoder or a down counter.

In the method for generating an interruption in that interrupt requiring system (which will be called "iRQ" together with the name of said interrupt requiring terminal), the CPU 33 is operating, as shown in FIG. 8 with the fundamental clock of 1.05 MHz on the basis of an external quartz oscillator (of 4.2 MHz) for generating the fundamental clock thereof. Since the fundamental clock is fed out of the E terminal of the CPU 33, it is divided by a frequency divider CC into six clocks of 32.8 KHz (which corresponds to the period of 0.0305 ms), which are fed to the CK terminal of the down counter DC. This down counter DC has its data terminals $D_0$ to $D_7$ fed with the data from the CPU in case it is selected by the CPU by means of the address coder AD connected with the address bus leading from the CPU 33, as shown in FIG. 4, (i.e., in case the pulse signal is fed to the LOAD terminal of the down counter DC so that the CPU is in its data generating state). The down counter DC latches those data so that its M/M terminal generates a "1" signal if its clock terminal receives the clocks of the same number as that of the aforementioned latched data after the latching operation. The CPU 33 starts its interrupt processings if that "1" signal is fed through a D flip-flop 35 to the $\overline{iRQ}$ terminal of the CPU 33.

When the CPU executes the interrput request program IRQP, it sets the down counter DC with the data coming therefrom and starts the count-down operation in response to the aforementioned clocks so that the interruption is executed, while the M/M signals are being periodically generated, each time the count down is ended, as has been described in the above.

Since the clock period of the embodiment of the present invention is 0.0305 ms and since the down counter DC has eight bits, it is possible to take multiples of 0.0305 ms of the period from 0.0305 ms to 7.81 ms as the interrput period. This interrupt period is set in response to the instruction from the CPU but can naturally take a period other than the aforementioned interrupt period if the aforementioned clock period is varied by varying the number of the stages of the frequency divider for preparing the aforementioned clocks.

Figure 9:
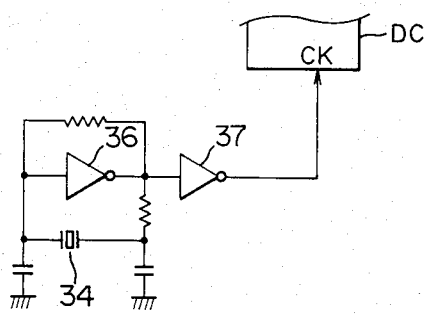
FIG. 9 shows an example in which a reference pulse signal generating circuit is externally provided without the use of a reference signal stored in the microprocessor.

On the other hand, it is easy to generate a clock signal for interruption even if both the operation clock signal of the microcomputer and the periodic signal to be generated by using not the binary counter but another clock generating means or another circuit are used, as has been described hereinbefore. As shown in FIG. 9, for example, the clock input CK of the down counter DC of FIG. 8 is fed with the output of the two-stage inverter oscillatory circuit including a crystal oscillator so that the timer interruption can be executed.

Now, the interrupt processing program IRQP will be specifically described.

If the program IRQP is started, as shown in FIG. 7, an interruption prohibiting flag is erected in the CPU so that the interruption may be prohibited not to doubly receive the interrupt signal in the course of that IRQP program until the execution of this program is ended. Specifically, an iRQ mask setting instruction is fed out. After this iRQ mask setting operation, the flow of the program IRQP is roughly branched into three flows. In one of these three flows, the flag $\phi_S$ is set up to start the sequence during the execution of the main program in the second high-speed processing routine (which will be merely called "PRH2"). When the first and second release switches $S_1$ and $S_2$ are turned ON, more specifically, the present flag $\phi_S$ is erected to advance the task to the photographic sequence. At this time, after the flag $\phi_S$ has been raised, the reading of the input out of the input port (by the program entered after 10 msecs) is interrupted to set the down counter DC at 0.24 msecs so that the time period for the sequence control is prepared. In another flow, the preparation of the time period for starting the running of the rear curtain during the running operation of the front curtain of the shutter when the high-speed shutter is to be conducted is made in accordance with the first high-speed processing routine (which will be merely called "PRH1"). More specifically, immediately after the start of the running operation of the front curtain of the shutter, the down counter DC (as shown in FIG. 8) is set (at its terminals $D_0$ to $D_7$) with the shutter second time so that the program IRQP can be executed to start the running operation of the rear curtain, while the front curtain is running, during said interrupt processings after the aforementioned set shutter second time has elapsed from the start of the running operation of the front curtain.

When this first high-speed routine is left, the two-bit flag at the later-described address RAMOC is so set at 0 that the later-described photometric arithmetic routine may be executed, before the task is shifted to the following processing.

Now, as the remaining third flow, there exists a flow which has been named the aforementioned "photometric arithmetic routine" but which will be called "PRH0" hereinafter. This PRH0 is such a program portion as reads the data out of the input port of the microcomputer thereby to execute the arithmetic of the photometry and is that program of the main program, from which the program for the aforementioned sequence control is precluded. In fact, the execution of that PRH0 takes place when in the interrupt processing of each 2 msecs in the present embodiment. More specifically, the digital value of the aforementioned object brightness is fed from the A/D converter ADC, which is made operative to convert the value of the object brightness in the analog value from the photometric circuit into an eight-bit digital value, so that whether or not the exposure is proper is displayed by means of the LEDs simultaneously as the data fed to the input port are read in to execute the exposure arithmetic.

Moreover, the detail operation of the program portion IRQP will be described in accordance with the flow chart of the IRQP of FIG. 7. If the CPU has its $\overline{iRQ}$ fed with the signal, when the aforementioned set value and the counted value become coincident, from the M/M terminal of the down counter DC through a latching D flip-flow 35, it sets the program counter with the data, which are stored in the addresses FFF8 and FFF9 of the memory area, i.e., the start addresses of the program portion IRQP thereby to execute this program portion IRQP.

When the execution of this program portion IRQP is started, as shown in the RAM map of FIG. 10, which flow (or task) of the aforementioned PRH0, PRH1 and PRH2 is to be executed is first judged from the values of the lower send bit (i.e., the bit 1) and lower third bit (i.e., the bit 2) at the address OC of the memory area of the RAM (which is stored in the CPU in the present embodiment).

Specifically, the labels are set as in the following Table:

| Name of Labels | Address OC of RAM | |
|---|---|---|
| | bit 2 | bit 1 |
| PRH0 | 0 | 0 |
| PRH1 | 1 | Disregarded |
| PRH2 | 0 | 1 |

Here, if the task of the PRH1 is selected, the program enters the interrupt processing, when in a high-speed shutter having a shutter speed of 1/125 sec to 1/1000 sec (i.e., 8 msecs to 1 msec), to fly to the PRH1 (i.e., the label name of the first high-speed processing routine) thereby to transfer the data (e.g., α, β, - - - , and MF of the RAM map of FIG. 10) at the address 13 of the RAM, which is set with the data for sequence control, to the output port 2 (OUT2), i.e., the sequence controlling drive terminal, which is set at the address E106, in accordance with the flow shown in FIG. 7.

Of those data transferred to the output port 2, the data γ and δ are signals for starting the running operations of the front and rear curtains of the shutter. In response to those signals, immediately before the task of that RH1 is started, as has been described in the above, the running operation of the shutter front curtain is started to interrupt the shutter time second after the lapse of the shutter time second which is set in the down counter DC. Then, if the bit meaning the aforementioned signal δ takes the value 1, the shutter rear curtain starts its running operation thereby to control the shutter time second of the high-speed shutter at the PRH1. In other words, any of the shutter modes 1 (i.e., the first high-speed processing) of 0.24 ms to 15.5 ms to be stored in the address 08 of the RAM is set (that is to say, the bit takes the value 1).

When those tasks of the first high-speed processing routine PRH1 are finished, a fly is made to the routine PRH2. As a result, the bit 1 (i.e., the flag PRH2) of the aforementioned address OC of the RAM1 is set at 1, and the bit 2 (i.e., the flag PRH1) is reset at 0. In order to return from the program portion IRQP just having been executed to the usual main program, the task is jumped to that main program return instruction after the end of the interruption, which is indicated at a label name CAiEN, to release the latch of the D flip-flop D-F/F35, which has latched the signal coming from the M/M terminal of the down counter DC, and to terminate the interrupt signal to the $\overline{IRQ}$ terminal of the CPU. Here, the release of the latch of the D flip-flop D/F/F35 is conducted by addressing and setting the clear signal generation which is set at the address E10F from the CPU by the address decoder AD. For example, by arbitrarily executing the call of the address E10F in accordance with another instruction, the interrupt signal to the terminal $\overline{IRQ}$ can naturally be cleared to release the interruption. Within the routine of the aforementioned label CAiEN, therefore, the content of the address E10F is set in an accumulator and executed in response to the instruction STA, for example, thereby to stop the feed of the terminal $\overline{IRQ}$ with the signal and to release the prohibition of the interruption so that the return is made to the main program in response to an instruction RTi.

The execution of the interrupt processing in the case other than the PRH1 will be described in the following. As illustrated in the flow chart of FIG. 7, it is first judged whether or not the flag PRH2 is erected at 1. If this flag PRH2 is erected at 1 (although the flag PRH1 has already been reduced to 0), the task is made to the label name SET2. In other words, a label name TMC is executed after the down counter DC is set at 0.24 msec (e.g., at $08). Since, in this label name TMC, the RAM has its area OF and its address 10 set at TC1 and TC2, respectively, the number of the iRQ interruptions is counted. For example, in case the sixth bit from the LSB of the TC1 is exclusively set at 1 whereas the remaining bits are left at 0, it is possible to prepare a timer of 2 msecs×32=64 msecs, because the period of the iRQ interruption is 2 msecs, and to prepare a timer ranging from 0.24 msec to 0.25×256=61 msecs when the set value of the down counter is 0.24 msec (provided for each 0.24 msec).

When the self-timer is used, moreover, a TC3 can be set at the area 16 of the RAM so that the number of the set-ups of the time second by the TC1 can be counted. This makes it possible to make a self-timer having a considerably long time period, e.g., two minutes.

The time seconds prepared by either of those TC1 and TC2 is used for the sequence control but only for a range of 0.24 msec to 60 msecs. In fact, therefore, the period of the iRQ is set at 0.24 msec.

In the TC1 and TC2, more specifically, after the down counter is set at 0.24 msec by the task of the PRH2, whether or not TC1=$00 and TC2=$00 is judged between the tasks having the label names TMC and CAiEN. For TC1 and TC2=$00, the processings of the TC1 and TC2 are not executed. For TC1 and TC2≠$00, the processing of the subtraction of 1 from those values is executed. Here, the symbol $ indicates a hexadecimal digit. After that, the task flows to the label name CAiEN and leaves the program portion IRQP. Specifically, the iRQ signal is cleared by setting the accumulator at $E10F thereby to execute the address E10F.

Now, after the start of the program portion IRQP, the task PRH0 is executed if the aforementioned flags PRH1 and PRH2 are neither erected nor processed. This task PRH0 is provided partly for preparing the time period necessary for the program other than the sequence control and partly for giving not only the exposure arithmetic for determining the timing of the data input from each switch input, the stop and the shutter time period but also the operation timing of the A/D converter for converting the photometry of the analog input into a digital value and the timing at which the digital value of said photometry is received.

In the task PRH0 thus described, the down counter DC is first set at 2 msecs. This is because, since the A/D converter used in the present embodiment is of the double integral type, it takes longer than the minimum 5 msecs to effect the conversion processing so that preparation of the time second shorter than 2 msecs is not required.

Figure 11:
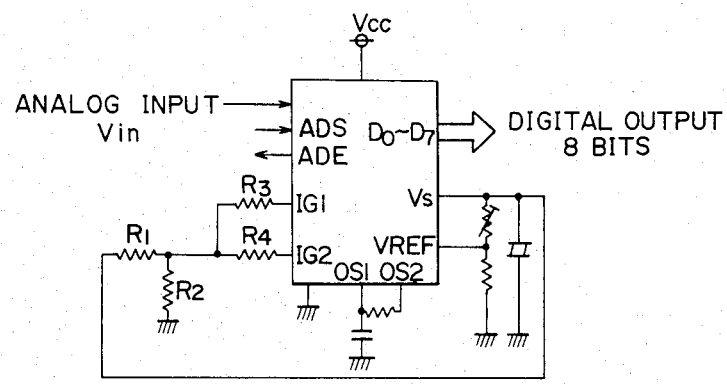
FIG. 11 is a diagram schematically showing the inputs of an A/D converter and a setting circuit both used in the present invention.

Here, the A/D converter used in the present embodiment is of the double integral type having an eight-bit output so that it is more precise than another system although it has a low conversion speed. FIG. 11 shows the major input and output signals of the present A/D converter (e.g., the product HA16613A of Hitachi Ltd.).

Indicated at $V_S$ and $V_{REF}$ are output terminals of a voltage stabilizing circuit which is built in said A/D converter ADC. And the terminal $V_{REF}$ is made operative to feed back the voltage fluctuations. The voltage thus stabilized is divided by resistors $R_1$ and $R_2$ into voltages, which are then fed to terminals IG1 and IG2 through resistors $R_3$ and $R_4$, respectively.

Those terminals IG1 and IG2 are used to limit a digital output $N_2$ for an analog input $V_{in}$ and has a relationship of $N_2 = 255 (R_1+R_2)/R_2 \cdot (V_{in}-V_{LL})/V_S$, wherein $V_{LL}=(R_2//R_3)/(R_1+R_2//R_3) \cdot V_3$. Clocks for the A/D converter ADC are generated at terminals OS1 and OS2 by the external circuit.

An ADS terminal is a signal input terminal for starting the A/D conversion when it receives a signal input while a terminal ADE is generating 0. Generally speaking, the A/D converter ADC has its ADS terminal fed with the start signal when the address $E10E is decoded. In the present embodiment, on the contrary, the A/D conversion is started by feeding the address $E108 with the data and by feeding the terminal ADS with a signal in the negative (i.e., breaking) direction.

The aforementioned terminal ADE is made operative to generate the A/D conversion end signal and is connected with that bit 7 (i.e., the eighth bit from the LSB) of the input port, which is set at the address $E103. The terminals $D_0$ to $D_7$ are latching and generating the previous data during the A/D conversion of the digital values which have been prepared by subjecting the analog input $V_{in}$ to the A/D conversion.

Now, the operations of the A/D converter having the construction thus far described will be described in the following in connection with the actual interrupt processing program.

The task PRH0 is executed, and the down counter is set at 2 msecs, as illustrated in the flow chart of FIG. 7. After that, judgement is made in view whether the terminal ADE is at 0 or not, more specifically, in dependence upon whether the bit 7 of the aforementioned input port is set at 1 or 0, because the terminal ADE is connected with the bit 7 of the input port, which is set at the address $E103 of the CPU, as has been described hereinbefore. If the terminal ADE is at 0, the digital value of the analog value of photometry, which has been finished, is introduced into the CPU. For the subsequent A/D conversion of the photometry, moreover, the terminal ADS is fed with a negative trigger so that the analog input for the A/D conversion when in the subsequent interruption iRQ after the lapse of 6 msecs may be introduced.

In case the terminal ADE is set at 1, on the contrary, the program for flying to the label name CAi1 to determine the photographic mode, for reading in the signal from each switch input necessary for the sequence control, and for simultaneously calculating the exposure is executed because the A/D converter is in its A/D conversion state.

Specifically, the task of the label name CAi1 is conducted. In this label CAi1, the task is branched into four flows in accordance with the value of a (dynamic I/O address) DA which is set at the address $11 of the RAM area.

Now, in the case of the aforementioned four branches, the control is made by the aforementioned DA values (from 0 to 3) in the address $11 of the RAM area. In the case of DA = 3, for example, the content of a DAT1 is stored in the $03 address of the RAM area. As the input information which is assigned to the input port addressed at $E100, more specifically, the respective input signals $S_2$, ST, EF1, EF2, B, AM, BC1 and BC2, which are named the DAT1, are read in, and the data thus read in are stored in the address $03 of the RAM area. For the subsequent interruption, moreover, 1 is subtracted from the DA value 3, and the task then enters the label name CAi2.

In the case of DA = 2, likewise, the respective input signals SF, SM, ME, AEL, SB, SR, FS and SC, which constitute the input information (DAT2) of the input port 2 addressed at $E101 are read in and stored at the address $04 of the RAM area. After that, 1 is subtracted from the DA value, and the task then enters the label name CAi2. In the case of DA = 1, the information of the ASA value, which corresponds to the ASA sensitivity fed in such a digital value as is expressed by a gray code, is stored in the upper five bits of the address $15 of the RAM area. After than, 1 is subtracted from the DA value, and the task enters the label name CAi2.

Now, in the case of DA = 0, the exposure arithmetic is executed by flying to a subroutine CFT. After that, the DA value is set at 3, and the task enters to the label name CAi2. In the task of the label name CAi2, the output signals L1, L2, L3 and LM for the display in the finder, and the output signal LS for displaying the operation of the self-timer are stored from the CPU at the address $12 of the RAM area so that the content thus stored is transferred to the output port 1, which is set at the address $E105, thereby to effect the display or the like in each finder. These displays can be changed every 2 msecs because the period of said interruption (PRH0) is 2 msecs. After that, the aforementioned processings TC1 and TC2 are conducted similarly to the latter half of the task PRH until the interruption is left.

In said IRQP, the interrupt information is received every 2 msecs and each photographic information such as DAT1 or DAT2 etc. is received in the constant period of 8 msecs, however, in the photographic informations, the informations from the switches $S_1$ and $S_2$ which are generally photometry switches as well as the photometry data are high in priority level. On the contrary, the ASA sensitivity and the open F value Fo are low im priority level, because it is not necessary to detect such informations in the short period.

Figure 39:
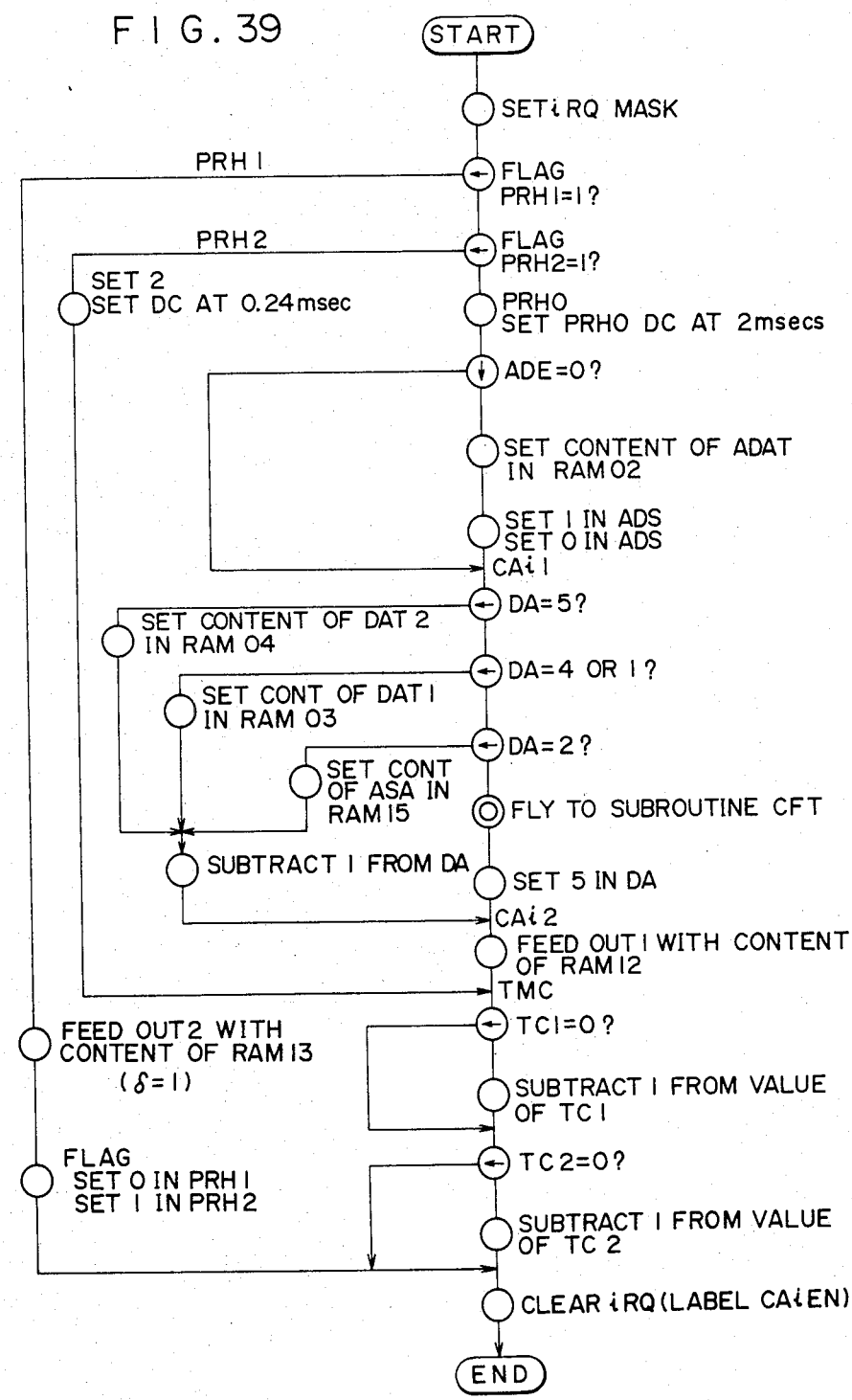
FIG. 39 is a flow chart varying the period of input information according to priority level.

FIG. 39 shows a flow chart in case that the period of input information is varied according to the priority level. Namely, the reading of DAT2 is effected at only the case of DA = 5, so that it is read every 2 msecs × 6 = 12 msecs. The reading of the ASA value is effected at only the case of DA = 2, so that it is read every 12 msecs. However, the reading of DAT1 is effected at only the case of DA = 4 and DA = 1, so that it is read every 2 msecs × 3 = 6 msecs. Similarly, the photometry operation is effected every 6 msecs.

As stated above, it is possible to read the photographic information at the higher priority level with a period m times as long as the interrupt period and to read the photographic information at the lower priority level with a period n times as long as the interrupt period, where n is larger than m, by using the interrupt processing. Further, it is possible to vary the priority level of the information according to the camera system because the values of m and n can be set arbitrarily.

The summary of the interrupt processing program has been described hereinbefore except the explanation of the subroutine CFT.

This subroutine CFT will be described in the following.

Figures 12, 17:
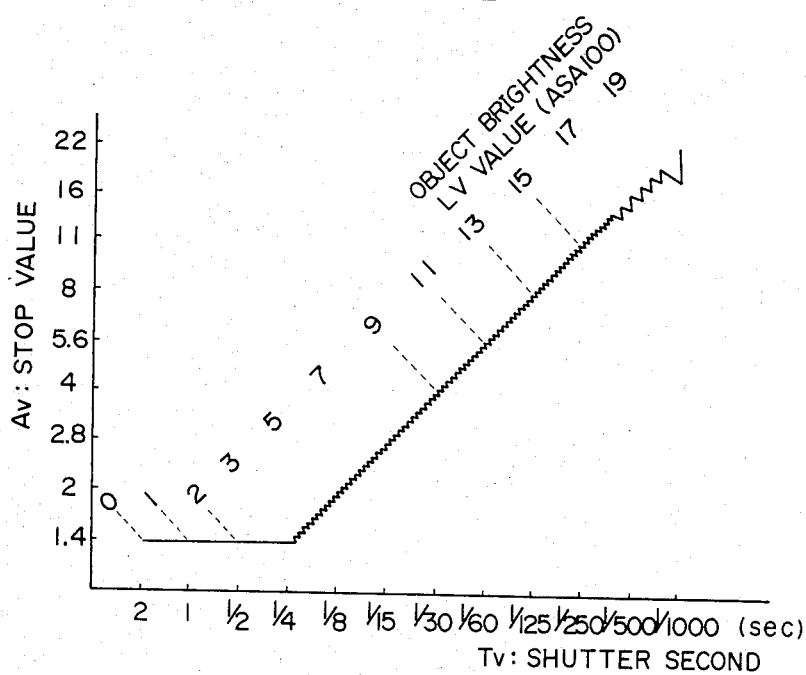
FIG. 12 is a graph illustrating a relationship indicating the exposure between an object brightness (at an LV value) and a shutter second.
FIG. 17 is a table of binary digits.

As the embodiment of the present invention, the exposure control adopts the program exposure control system and is controlled to satisfy such a relationship among the shutter second, the stop value and the object brightness (i.e., the LV value) as is illustrated in FIG. 12.

It is quite natural that the photographic stop value cannot be set at a level higher than the open F-number of the taking lens.

In the present embodiment, the arithmetic of the exposure control is conducted from the mutual relationship among the following six quantities according to the general apex system.

Specifically, an equation of $E = F_0 + S + P = A + T$ is obtained if the exposure of the film is designated at E, the open F-number of the taking lens at $F_0$, the film sensitivity at S, the photometry at P, the photographic stop value at A, and the shutter speed at T.

Now, the photometry P is stored in the digital code at a step of 0.1 EV in the address $02 of the RAM area by the A/D converter ADC, and the film sensitivity S is fed as a gray code binary digit by the actions of five cooperating switches which are connected with the lower five bits of the input port having the address at $E102. Said gray code binary digit is converted into the binary digit of the usual BCD code by the program in the subroutine CFT. After that, that binary code of the usual BCD code is further converted into an arithmetic code and is coded at a step of $\frac{1}{8}$ EV (at the address $01 of the RAM).

The open F-number $F_0$ of the taking lens is a binary digit of three bits and is coded at each step of 1 EV into the lower three bits of the address $15 of the RAM area and stored in the address $00 of the RAM.

Here, the arithmetic codes to be used for calculating the respective informations are tabulated in FIGS. 13(a) to 13(e). In the present embodiment, the calculations among the respective informations are so facilitated by making use of the arithmetic codes that the T value and the F-number, for example, can be easily calculated, thus considerably shortening the length of the program.

Specifically, the code conversion table of the film sensitivity and the ASA value is illustrated in FIG. 13(a), in which the input gray code, the gray code conversion hexadecinormal digit and the arithmetic program code are tabulated each $\frac{1}{8}$ EV for each ASA value in the upper medium and lower rows, respectively. FIG. 13(b) tabulates the arithmetic code of the open F-number $F_0$ of the taking lens.

The respective arithmetic codes of the object brightness Bv, the shutter second (i.e., the exposure time) Tv and the stop value Av are tabulated in FIGS. 13(c), 13(d) and 13(e), respectively. The values T and A are arithmetically coded at each 0.1 EV. In case the object is bright, i.e., at the rightwardly rising linear portion of FIG. 12 in which the apex of the exposure is high, the values A and T in a relationship of $E = A + T$ for a certain exposure E has a difference of 1 in the EV value.

As a result, the arithmetic codes can be calculated by $T = A + 1$ and $E = 2A + 1$.

Here, in the case of the low brightness, the calculations are made by $E = 2F_0 + 1$ and $T = F_0 + 1$ because $A = F_0$.

In the case of the high brightness, the generation of the high brightness warning takes place only when the object brightness exceeds 19 EV (for a shutter second of 1/1000 sec and a stop value of F22).

If the shutter second fails to exceed 1/60 sec (for 5 EV), on the other hand, the low brightness warning is generated so as to commonly warn the blur.

Moreover, the task of the subroutine CFT for the exposure arithmetic will be described in accordance with the flow chart illustrated in FIG. 14.

If the task flows to that CFT routine, there first exists an arithmetic code conversion subroutine for arithmetically coding both the ASA value of the film sensitivity information, which is stored in the lower three bits at the addresses $01 and $15 of the RAM area (and which is fed in the gray code) and the $F_0$ value of the open F-number information, respectively.

Figure 15:
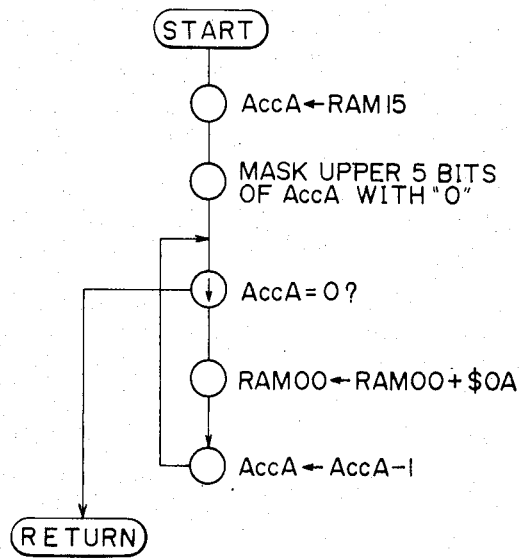
FIGS. 15 and 16 are flow charts respectively showing the Fo conversion subroutine and the F-number conversion subroutine which are used in the CFT subroutine shown in FIG. 14.

For the $F_0$ value, in fact, it is necessary to multiply the content of the lower three bits at the address $15 of the RAM area ten times because the code assignment table of FIG. 13(b) does not tabulates such an arithmetic code as can calculate the exposure E. The flow chart of the $F_0$ value conversion subroutine, which is called "FOC", is illustrated in FIG. 15. In this Figure, letters ACCA indicate the arithmetic register A.

Figure 16:
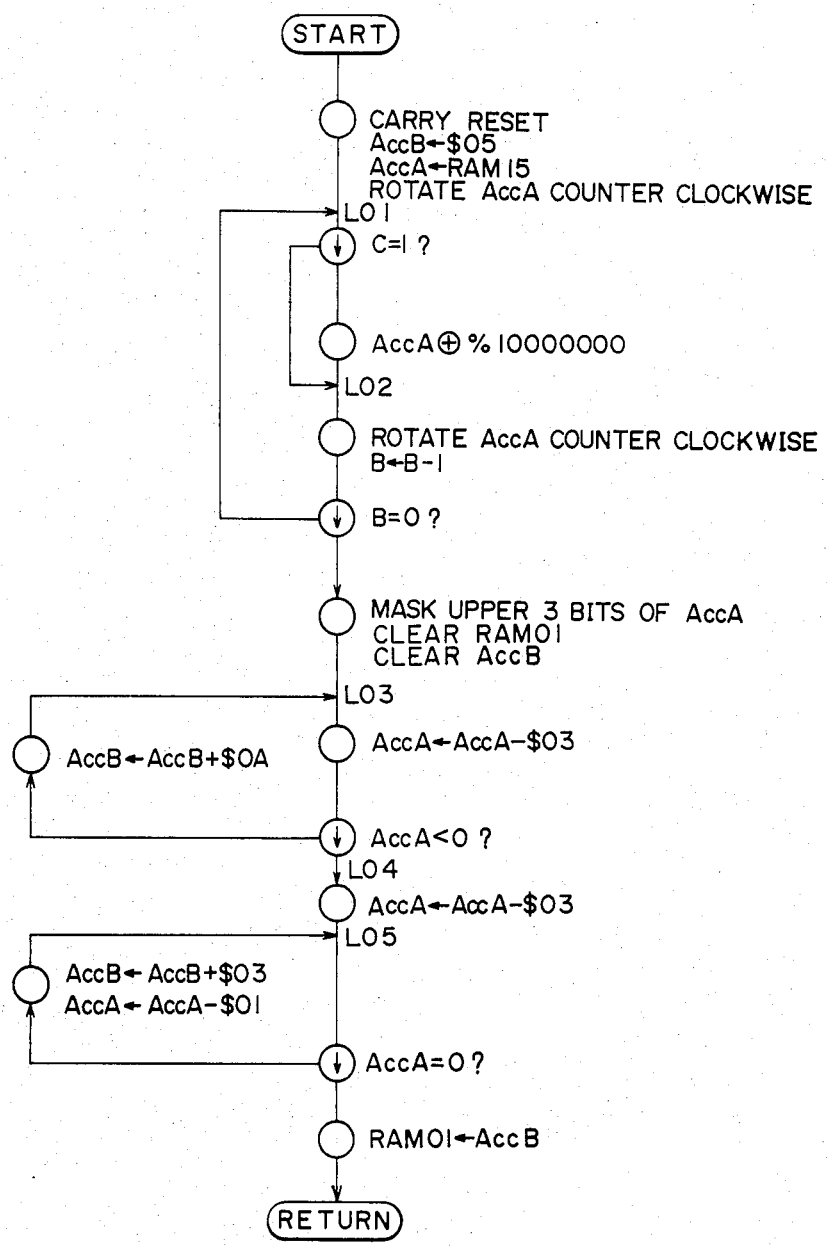

Likewise, the flow chart of the ASA value conversion subroutine ASC for converting the ASA value of the film sensitivity into the arithmetic code is illustrated in FIG. 16.

Here, the reason why the aforementioned ASA value is received in the gray code is because the gray code of five bits, which is assigned for each ASA value by turning an ASA value setting dial by means of a mechanical switch of five bits, is generated and fed to the input port in accordance with the present embodiment. Here, the gray code is also called the "alternate binary system", in which the codes representing two adjacent numbers have different codes of 0 and 1 only at one figure. As a result, even if the aforementioned ASA value setting dial should be slightly displaced, the contact corresponding to the bit generates the code representing the adjacent number at the farest so that the error can be at a relatively low value.

For the respective digits, the codes of the usual binary digits and the binary digits by said gray code are tabulated in FIG. 17.

In order to effect conversion from the gray code into the usual binary digit: for the highest bit of the two, $a_n = b_n$; and for the subsequent bit $b_{n-1}$, $b_{n-1} = a_{n-1}$ if $a_n = 0$, and $b_{n-1} = \overline{a_{n-1}}$ (in which the overlying line — indicates the "reverse" so that $a_i = 1$ for $a_i = 0$ whereas $a_i = 0$ for $a_i = 1$) if $a_n = 1$. Next, for the bit $b_{n-2}$: $b_{n-2} = a_{n-2}$ if $a_{n-1} = 0$; and $b_{n-1} = \overline{a_{n-1}}$ if $a_{n-1} = 1$. Thus, the sequential conversions can be made by discriminating the values at a one-higher rank.

Here, the conversion algorism will be explained with reference to the ASC subroutine flow chart illustrated in FIG. 16. First of all, the number of the figures for conversion is set in an ACCB, and the codes by the gray code are transferred to the address $15 of the RAM area from the input port which has been addressed at $E102 by the iRQ interrupt program. AS a result, the codes $a_n$, $a_{n-1}$, - - -, and $a_0$ (n=4) of the address $15 of the RAM area are introduced into the ACCB. In accordance with the aforementioned algorism, $a_n = b_n$ is first used, and it is judged whether the value $a_n$ is 0 or 1. The value $a_{n-1}$ is then changed to $b_{n-1}$, and $i = n$ to 1 (wherein $i = 5$ to 1) is repeated. In other words, by repeating the labels from L01 to L05, the flow chart is constructed.

The values thus converted into the usual binary digits have to be further converted into arithmetic codes because they are merely sequential values of five bits. For these conversions, the ASA values are set for each $\frac{1}{3}$ EV, as tabulated in FIG. 13(a). Since the arithmetic codes are of 1/10 EV, the value of 1 EV is divided into 3/10, 3/10 and 4/10 so that the codes have an error resulting from the quantization. However, those values are used as the arithmetic codes. More specifically, the values before the arithmetic code conversion are 1 EV in the apex value for every three and in the arithmetic codes for every $0A. In case the values before the conversion are 3m (wherein m designates an integer), the arithmetic codes are expressed by ($0A × m). Likewise, the arithmetic codes are expressed by ($0A × m + $03) in the case of 3m + 1 and by ($0A × m + $06) in the case of 3m + 2. In the flow chart of the ASA value conversion shown in FIG. 16, those m values for the lables from L03 to L04 are calculated from the values before the conversions, and ($0A × m) is introduced into the ACCB so that the fractions smaller than 1 EV from the label L04, i.e., the values of $03 and $06 are added to the ACCB and are stored in the address $01 of the RAM, thus finishing the arithmetic coding operations of the ASA values in accordance with the ASC subroutine. Now, the description will be reverted to the explanation of the subroutine CFT. After the $F_0$ values and the ASA values have been converted into the arithmetic codes by executing the tasks FOC and ASC, the addresses $00, $01 and $02 of the RAM area are stored in the arithmetic codes with the $F_0$ values, the ASA values and the photometries $P_0$, respectively. Now, the arithmetic of the exposures are to be conducted. From BV (i.e., the object brightness) = ASA + $F_0$ + P by the aforementioned apex system, the contents of the addresses $00, $01 and $02 of the RAM area are added to the ACCA of the arithmetic register (i.e., the accumulator) A and are stored. In order to judge the region to be limited by the $F_0$ value, on the other hand, the arithmetic registers B and ACCB are stored with $2F_0 + 1$ in the apex value, i.e., the value, which has been prepared by adding $01 to the twice value of the arithmetic code at the address $00 of the RAM area, in the arithmetic code.

Then, the content of the ACCA and the content of the ACCB are compared. If ACCA ≦ ACCB, it is judged that an exposure exists in the region which is restricted by the $F_0$ value (i.e, the so-called "open F-number limited region"). Since the stop value A is set equal to the $F_0$ value, therefore, the content at the address $00 of the RAM area is specifically transferred to the address $07 (as shown in FIG. 10) of the RAM area so that the arithmetic code of the shutter speed (in seconds) T, i.e., the value prepared by subtracting the content at the address $00 of the RAM area from the content of the ACCA in accordance with the equation of the apex of $T = E - A = E - F_0$ is stored in the address $06 of the RAM area. Since the aforementioned shutter second value T is the apex value, the shutter second cannot be controlled as it is. Therefore, the shutter mode conversion subroutine, which is called "SMC" hereinafter, is executed so that the apex value of the aforementioned T value is logarithmically elongated.

Here, the concept of the shutter mode conversion will be first described. The shutter mode has its seconds from 0.24 ms to 4 s assigned to the respective addresses $08 and $09 of the RAM area in 16 bits (as illustrated in the RAM map of FIG. 10). The following description is directed to the shutter mode conversion between 1 s and 2 s of the shutter seconds.

Figure 19:
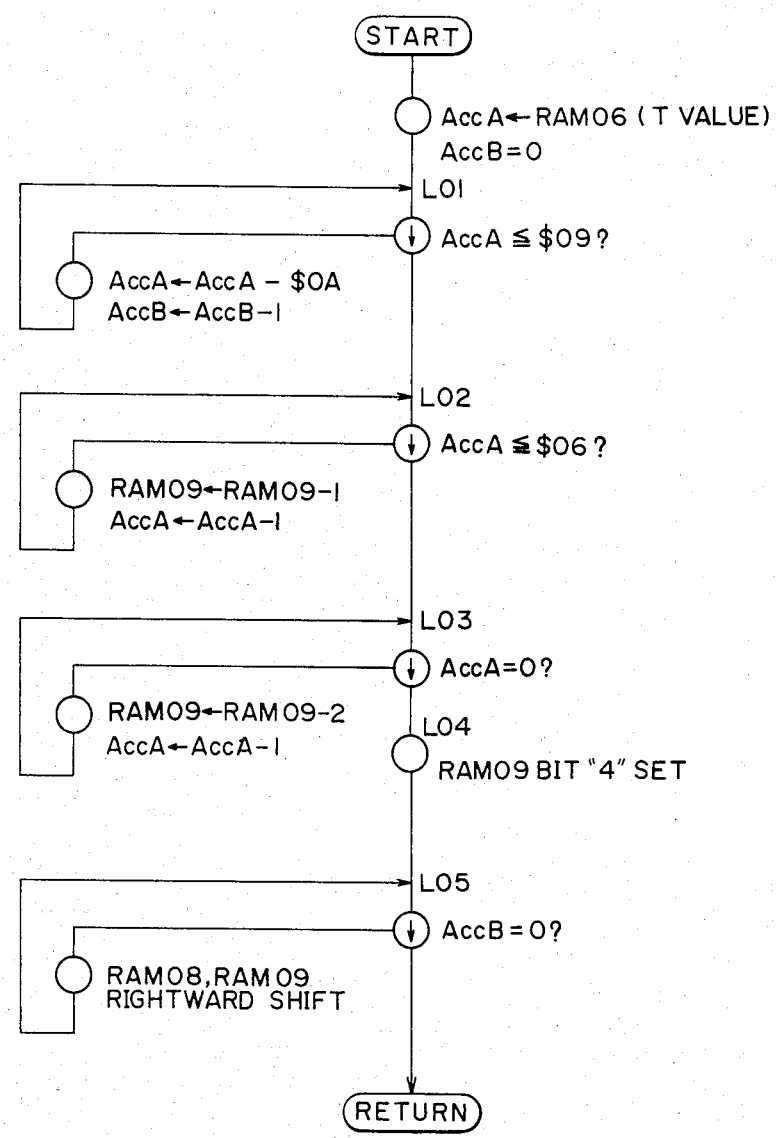

First of all, the data, which have been prepared by converting the arithmetic results (e.g., the apex values or the EV values) of the T values of the shutter second stored at the address $06 of the RAM area into the shutter modes in accordance with the subroutine SMC shown in FIG. 19, are expressed by the codes of the five of the bits of the address $08 or $09 of the RAM area. The relationships between those codes of the five bits and the EV values are tabulated in FIG. 18, in which the shutter mode conversion values are assigned for each 1/10 EV.

For example, when the arithmetic results are obtained in $-1 + 7/10$ at the apex values, the calculated values tabulated in FIG. 18 take 1.23 seconds. In the shutter modes, there are determined the codes of the total sixteen bits of 00010011 at the address $09 and 00000000 at the address $08 of the RAM area so that the actual shutter seconds elongated in the logarithmic manner are generated on the basis of those codes of the sixteen bits. In another example, if the T values of $(4 + 7/10)$ EV at the apex values, the RAM area has its addresses $09 and $08 expressed by 00000000 and 10011000, respectively. In case the apex values have an equal fraction, the codes are made such that the five shutter mode bits are equal and such that they are shift to the right (i.e., in the direction of the lower bits) by the difference of $(-1) - 4 = -5$ of the integer portions of the apex values. For the fraction values of the T values of the apex values generated by the photometry arithmetic, therefore, the five shutter mode bits are determined in accordance with the shutter mode conversion Table of FIG. 18 so that the shutter mode conversion bits of the T values are determined if only the integer portions of the T values (provided that $-1$ is used as a standard of the integer portions) are shifted to the right.

The shutter mode conversion subroutine SMC based upon the aforementioned concept will be described with reference to FIG. 19. First of all, the content at the address $06 of the RAM of the photometric arithmetic T values is introduced into the ACCA thereby to clear the same which is stored with the integer portions of those T values.

Moreover, $0A is subtracted from the value of ACCA in accordance with the label L01. This subtraction is continued until ACCA ≦ $09, and the number of the subtractions is counted at the ACCA thereby to determine the values of the integer portions. The values of the fractions and the integer portions are separated between the ACCA and the ACCB, respectively.

At the lavel L02, therefore, the patterns of the five of the shutter mode bits are determined with reference to the Table of FIG. 18.

If the ACCA exceeds $06, the shutter mode conversion values for each 1/10 EV are sequentially renewed. The loops, in which 1 is subtracted from the content of the ACCA until the latter becomes $06 and in which 1 is subtracted from the address $09 of the RAM area, are rotated. When the ACCA becomes $06, the label L03 is entered so that the shutter mode conversion values are alternately renewed for every 1/10 EV. As a result, the paterns of the lower four of the five-bit patterns are determined by rotating the loops in which 1 is subtracted from the ACCA whereas 2 is subtracted from the content of the address $09 of the RAM until the ACCA becomes $00. Since the remaining upper one bit is 1, the patterning of the five bits is ended by setting 1 at the bit "4" of the address $09 of the RAM area. At the label L04, 1 is set in that bit "4". At the label L05, on the other hand, 1 is subtracted from the content of the ACCB by using that the inter portions of the T values are stored in the ACCB. The loops, in which the addresses $09 and $08 of the RAM area are respectively shifted one bit to the right, are rotated until the ACCB takes 0. As a result, the shutter mode conversion subroutine SMC is ended.

Figure 14:
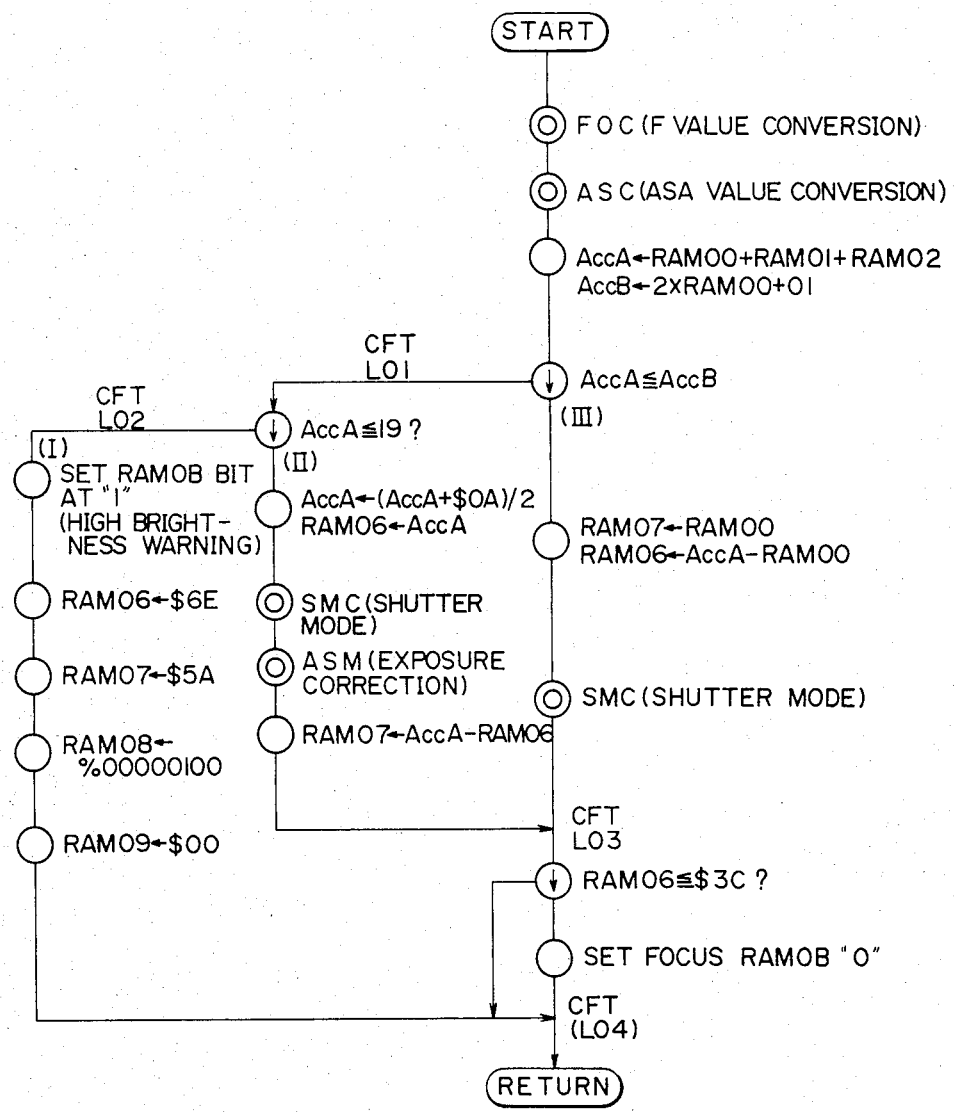
FIG. 14 is a flow chart for exposure arithmetic and is called a "CFT subroutine"

Now, if the aforementioned SMC subroutine is executed, the program (III) of the open F-number limited region of the exposure arithmetic subroutine CFT (as shown in FIG. 14) is ended, and the task is shifted to the label L03.

On the other hand, in case the E (i.e., the exposure) value is higher than $(2F_0+1)$ EV, i.e., in case that it is in the program exposure control region or in the high brightness warning region, the task (II) or (I) of FIG. 14 is executed. When the E value exceeds 19 EV, the task (I) of the label L02 is executed, and the control of the program exposure control region indicated at (II) is conducted when the E value fails to exceed 19 EV, i.e., $6E in the arithmetic code.

Now, in the task (II), the T value of the shutter second is calculated by $(E+\$0A)/2$.

More specifically, the content, which has been prepared by adding $0A to the content of the ACCA and by shifting the added content one bit to the right, is stored in the address $06 of the RAM area. After that, the aforementioned shutter mode conversion SMC is executed, and the exposure correction subroutine ASM is further executed.

Since the minimum period for the iRQ interrupt processing is 0.24 msec, the LSB at the address $08 of the RAM area for storing the shutter mode data takes 0.24 msec.

Now, in the shutter mode conversion subroutine SMC, in order to set a high-speed shutter second, only the values of the integer portions are shifted to the right of the addresses $08 and $09 of the RAM area. As a result, the lower one or two bits of the five-bit pattern of the aforementioned shutter mode leaves the scope of the address $08 of the RAM area. Thus, the shutter mode is determined by the upper four or three bits of the aforementioned five-bit pattern.

As a result, since inconsistency is caused from the T value determined by the exposure arithmetic, the T value is determined by the upper four or three bits of the aforementioned five-bit pattern so that the F value can be determined from that T value. This is the task of the exposure correcting subroutine.

More specifically, there is obtained an exposure correcting Table shown in FIG. 20, on which the stop value is based to take scattered values in the places where the T value in the vicinity of 1/1000 second of the curve plotting the shutter second and the stop value of FIG. 12 is scattered. This is because the arithmetic codes (after the conversion) of the TV values take the same value as in 1 msec to (1+3/10) msecs of FIG. 20, for example.

Figure 21:
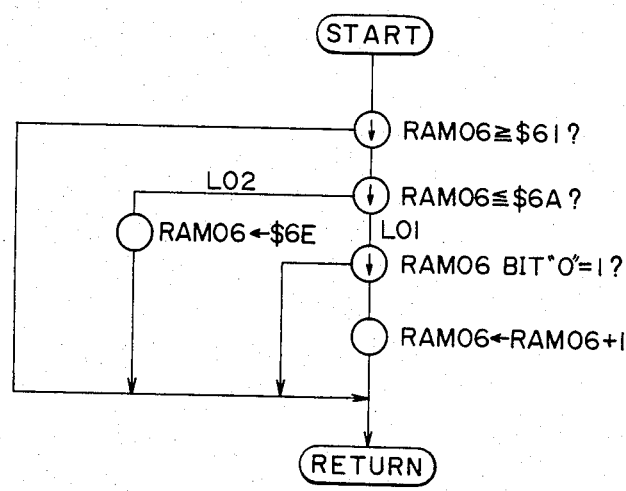

As a result, the correction of the exposure values is conducted in accordance with the flow chart of the exposure correction subroutine of FIG. 21. When the arithmetic code of the T value is equal to or lower than $61, however, the exposure correction is not required in the Table of FIG. 20 below the broken line.

In the ASM flow chart, therefore, the present exposure correction is conducted only when the content (i.e., the T value) of the address $06 of the RAM area exceeds $61. In case the T value is smaller than $6A, on the other hand, the correction is required only when the arithmetic code of the T value is odd, and the quantity to be corrected is +1. Thus, whether the arithmetic code of the T value is even or odd is judged in accordance with whether the LSB of the address $06 of RAM area is 0 or 1. If the bit "0" of the address $06 of the RAM is 0, no correction is made. A number 1 is added to the content of the address $06 of the RAM if that bit is 1, thus finishing the correction.

Next, in case the arithmetic code of the T value exceeds $6B, the task advances to the label ASML02 to effect all the corrections to the value $6E, until the present subroutine is left.

When the ASM subroutine thus far described is left, the CFT subroutine calculated the arithmetic code of the stop value in accordance with an equation of $A=E-T$ by the use of the T value which has already been corrected. The arithmetic code thus calculated is transferred to the address $07 of the RAM area, and the task enters the label CFTL03. It is judged whether the T value for the low brightness warning region is lower than 1/30 sec, i.e., $3C in the arithmetic code or not. If the R value is lower than $3C, the LSB, which is the bit of the low brightness warning at the address $0b of the RAM area in the RAM map of FIG. 10 stored with the display mode, is set with 1, and the present CFT subroutine (as illustrated in FIG. 14) is left.

In case the E values left in the CFT subroutine are 19 EV and higher than $6E in the arithmetic code, the task enters the label CFTL02. Then, the high brightness warning is displayed because the exposure cannot be controlled by the camera according to the present embodiment. More specifically: the lower second bit of the address $08 of the RAM area is set with 1; the address $06 of the RAM area indicating the T value of the arithmetic code is set with $6E (1/1000 sec); the stop A value is set with $25A (F22); the address $09 of the RAM area of the shutter mode is set with $08; and the address $02 of the RAM area is set with $00. Thus, the task leaves the CFT subroutine.

Thus, the description of all the programs of the CFT subroutine is ended together with the description of the iRQ interrupt program.

In the embodiment of the present invention, the effective photographic control can be performed by weighing in accordance with the importances of the respective processings by the use of the interrupt processing and by changing the interrupt timings.

The description of the main routine of FIG. 6 is again restored. After the initialization, the power-on subroutine is entered. This routine confirms that the finish of the mirror charge and the feed of the film can be brought to the photographic positions before the subsequent photographic arithmetic and sequence control are entered. This routine aims at the mirror charge and the film feed subsequent to the operation in which the power source battery is mounted in the camera after it has been taken out of the camera during the mirror charging operation or the film feeding operation.

As an example, the camera in which the present invention is practised has built therein two motors, i.e., a motor for charging the mirror and the shutter, and a motor for feeding the film. The output MM for driving the former motor and the output MF for driving the latter motor are set at the bits "1" and "0" of the address $13 of the RAM area, respectively, and the output port is made to have the address $E106.

The camera is further equipped with mechanical switches which are made coactive with the mirror mechanism and the shutter mechanism and which are turned on, while the motor and the shutter are being charged or not, so that they are turned off at the end of the charging operations.

As a result, the signals of the information XM of the mirror and the shutter by the aforementioned mechanical switches are "0" before or during the charging and "1" at the end of the charging.

Figure 22:
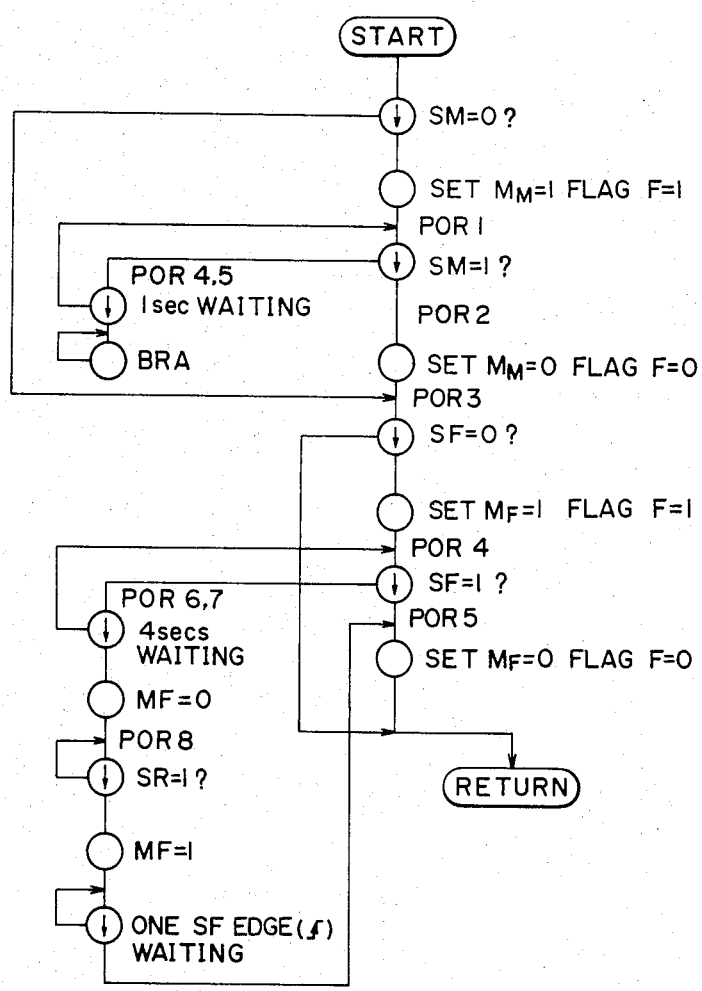
FIG. 22 is a flow chart showing a power-on routine.

As to the film motor having been described hereinbefore, the SF signal of the winding switch is closed to generate "0" during the film feeding operation and is opened to generate "1" at the end of the feeding operation. Those informations SM and SF are fed to the second input port, which is assigned to the address $E101, so that the power-on routine is executed on the basis of those data. The flow chart of that power-on routine is illustrated in FIG. 22.

First of all, the data of the mirror charge switch SM are discriminated, and the task flies to the label PER3 for SM=1 and at the end of the charging operation. For SM=0, i.e., during the charging operation or before the charging operation, the bit "1" MM is set (i.e., 1 is erected) at the address $13 of the control output RAM area so that the charge motor is rotated. Simultaneously with this, 1 is erected at the flag F at the address $0C of the RAM area. That flag F never fails to raise 1 during the sequence control or while the charge motor or the film feeding motor is in its executing operation so that a malfunction is prevented by prohibiting the reading operations of the first and second release switches $S_1$ and $S_2$.

The program having reached the label POR1 confirms whether or not SM=1 and is made to wait for the end of the charge (SM=1). During the waiting operation, a one-second timer is operated by the TC1 and TC3 (although the method of using the TC3 will be described hereinafter). In case the waiting operation continues for a period longer than 1 sec, the task enters the permanent loop BRA which is composed of no-operation and branch instructions.

In order to leave that permanent loop, the operations of the CPU have to be completely stopped for the subsequent resetting operation.

When it is judged that a malfunction is caused as a concrete symptom, e.g., in case the time period necessary for the charge takes longer than 1 sec, as has been described hereinbefore, there are invited the reduction in the battery power, the reduction in the motor torque, the malfunction in the motor, which may invite a fear that the camera is troubled as an erroneous operation or the overheat of the battery if it is operated as it is. In order to prevent the generation of the aforementioned troubles, this permanent loop is entered so that all the photographic operations can be interrupted to urge the proper disposal for the malfunction. Since, in this case, the permanent loop can be left only by resetting the CPU through the breaking operation of the power source.

On the other hand, as soon as the switch SM takes "1" within one second, an output 0 is fed to the MM of the output signal of the mirror drive motor to turn OFF the motor, and the flag F is cleared (or set with 0) so that the countermeasured for the charge motor are ended.

Next, whether or not the film feed is necessary at the label POR3 is judged from the information of the winding switch SF. The present routine is left if SF=1 and in the feed ended state. If SF=0, 1 is fed to the MF of the film winding drive output signal thereby to operate the feed motor. The flag F is set at 1 similarly to that of the aforementioned charge. Here, wait is made until the SF takes 1. If the wait is continued longer than 4 secs, however, MF=0 is made to hold, and the rotations of the motor are stopped. (The setting of the timer for 4 secs is effected by making use of the TC1 and TC3 similarly to the charging operation.)

The malfunction, in which the film feeding motor continues its rotations for a time longer than 4 secs, takes place when the film is tensiled, i.e., when the final frame of the film is not completely wound up but is left in its midway. In this case, the rewinding switch SR is awaited to be turned on. This switch SR is made so coactive with a film reverse preventing mechanism that it is turned on to feed the signal of SR=1 to the CPU and so that the film winding mechanism is set free. As a result, the rewinding operation can be conducted even if the film feeding (or winding) motor is rotated for MF=1. The film feed is not conducted but the cam for turning on and off the winding switch SF is rotated to raise the SF signal to "1". Incidentally, the switch SR is mechanically turned off if the film is fed one frame.

At the label POR8 in the power-on routine, as has been described hereinbefore, the rewinding switch SR is awaited to be turned by the operator. Simultaneously as the switch SR is turned on, the feed motor is rotated. As a result, the motor is rotated for MF=1 until the SF signal takes "1" to generate MF=0 thereby to reset the flag F (at 0), and the present subroutine is then left. If the film feed is ended within 4 secs, on the otherhand, MF=0 is made to hold, and the flag F is reset, thus ending the present power-on routine.

Thus, the initial settings of the camera are finished. The main program enters the auto-load subroutine and judges whether the idle feed of the three frames when in the film charging operation is to be conducted or the film has already been charged so that the photography can be effected. This judgement resorts to the information of the counter switch SC and the click switch SB, as has been described hereinbefore. For SC=1 and SB=1, i.e., SC·SB=1, the auto-loading operation is conducted, but jump is made over the auto-loading operation for the other condition.

Figure 23:
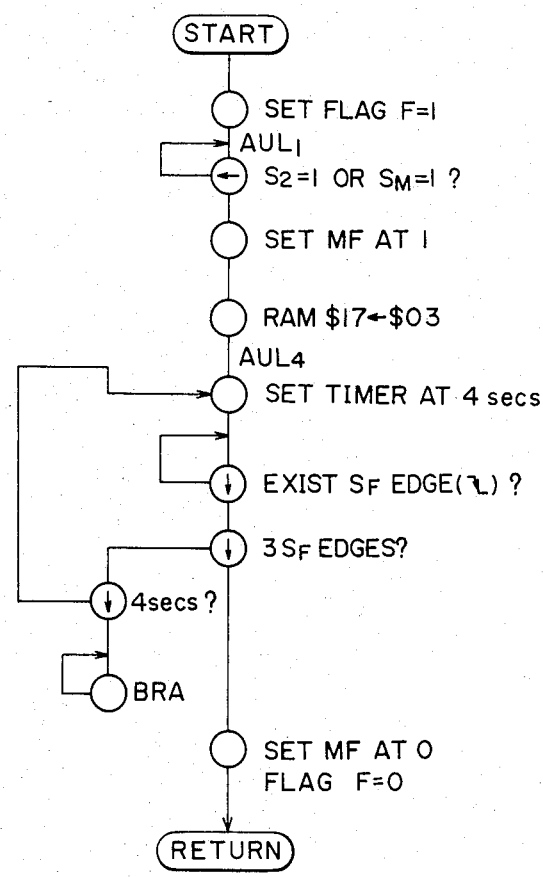
FIG. 23 is a flow chart showing an auto-load subroutine.

The auto-load subroutine raises the flag F so as to prevent the malfunction, as shown in FIG. 23. After that, when the second release switch $S_2$ or the mirror charge switch SM is in the state "1", i.e., when the sequence control may possibly be started, the case can be conceived, in which the mirror or the shutter charge is operated by some cause. It is, therefore, confirmed that at least the second release switch $S_2$ and the mirror charge switch SM are at "0" thereby to prevent the malfunction. As a result, in case if the switches $S_2$ and SM are at "1", wait is made until they take "0". If both the switches $S_2$ and SM take "0", an output MF=1 is generated to start the film feed, and the idle three frames are fed to the address $17 of the RAM area to set the timers TC1 and TC3 at 4 secs. Wait is made until the negative edge of the SF is detected. Though, it is not shown in the flow chart, the error detection can be prevented if a plurality of detections etc. which are normal processes for preventing the detection of the chattering of the mechanical type switches are carried out. When the negative edge of the SF is detected, 1 is subtracted from the content of the address $17 of the RAM area, and the task is returned to the label AUL4 so that the SF edge detecting loop is rotated until the negative edge are detected three times. In case it takes more than 4 secs, the permanent loop is entered similarly to the mirror and shutter charging operations. If the edge detections are conducted three times, moreover, the motor rotations are stopped with MF=0, and the flag F is cleared to leave the auto-load program, thus finishing the complete photographic preparation for the camera.

If the first-step photometric switch (i.e., the first release switch) $S_1$ of the release two-step switch is subsequently depressed, the photometry is started, and the program advances to those for the photographic mode, the exposure arithmetic and the display. If the switch $S_1$ is OFF, moreover, the AEL signal is judged. The program for judgement of the auto-load is restored for AEL=0 so that the loop is rotated until the $S_1$ or AEL is turned ON. The AEL signal is generated by depressing the AEL (i.e., the AE lock) switch so that the photometry upon the depression is stored, and the photography started when the second release switch $S_2$ is turned on is conducted at the exposure, which is calculated from the photometry at the time of the depression, so long as the depressed state is continued. Moreover, construction is made such that the release of the AEL may be effected merely by releasing the AEL switch.

Figure 24:
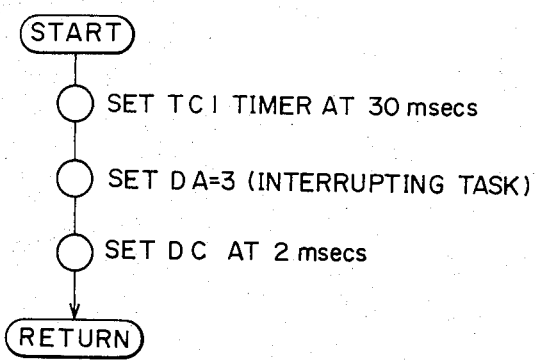
FIG. 24 is a flow chart showing the processing routine of the $S_1$ switch of a release.

If $S_1=1$ or AEL=1, the $S_1$ processing subroutine illustrated in FIG. 24 is first executed to set the timer at 30 msecs. Then, the switch $S_1$ is turned ON to supply the power to the photometric circuit which includes a light receiving element for logarithmically compressing the photometry. After that, the time is prepared for stabilizing that photometric circuit. On the other hand, the data address AD for determining the task of the interrupt program is set with 3, and the down counter DC for determining the interrupt period is set with 2 msecs.

When the task leaves the $S_1$ processing routine, the photometric arithmetic subroutine is executed. After that, it is judged whether or not the period of 30 msecs set by the $S_1$ processing routine has been elapsed, and the photometric calculations are repeated until that lapse takes place. Since, in this meanwhile, the interruptions are periodically made, the various switch informations for determining the phtoographic mode can be sufficiently read in.

Figure 25:
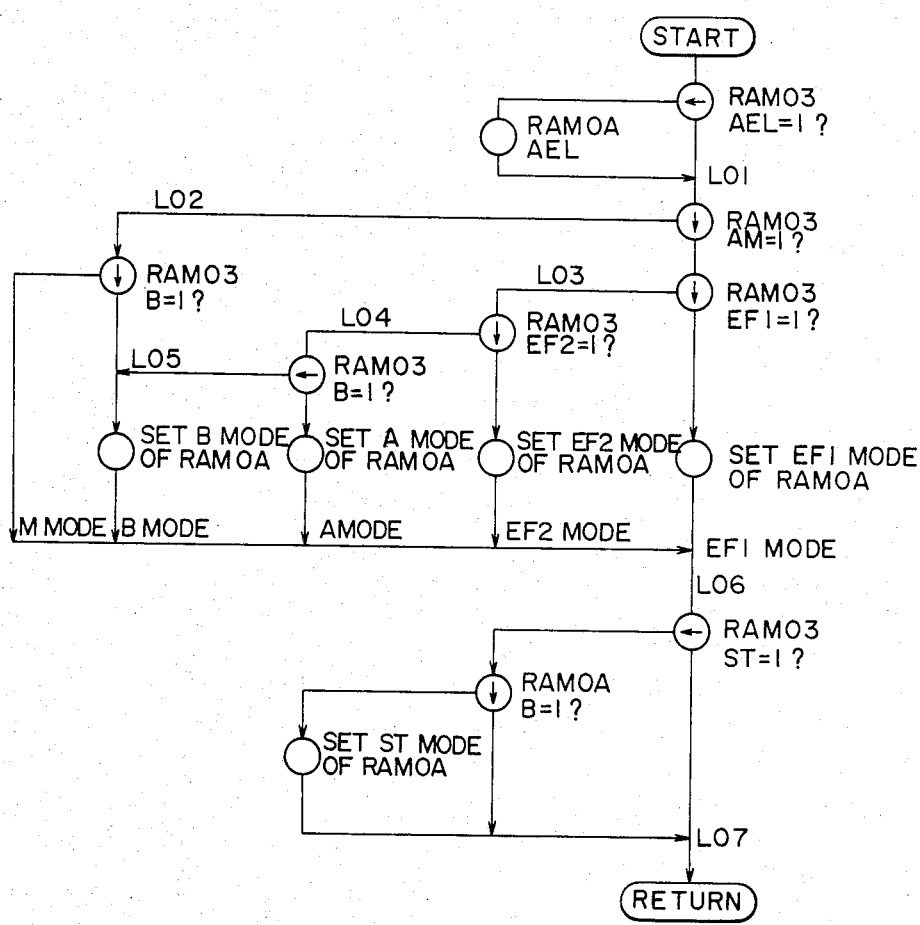

Next, a label name EMC is entered to start the photographic mode conversion subroutine illustrated in FIG. 25.

This subroutine determines which mode the photography is to be effected by for each mode switch of the camera body. As the camera switch inputs, the camera has: the switch AM for determining the manual photography or the programmed exposure photography (e.g., the manual photography for AM="0"); the bulb switch B; the EF1 for setting the stop at 5.6 for the strobo photography in accordance with the strobo; the EF2 for setting the stop 11; and the self-timer operating switch ST for starting the self-operation by lighting the LEDs when it is turned on.

The photographic mode conversion table which is determined by the states of the grouped switch inputs is illustrated in FIG. 26, in which: M designates the manual photography; A the program photography; EF1 the stop 5.6 and the shutter speed 1/100; EF2 the stop 11 and T=1/100 sec; and B the bulb photography. The letters ST indicates that each photography is conducted after the self-timer operation. The determined photography mode state, which has been converted by that switch input mode in accordance with the conversion table of FIG. 26 is stored at the address $0A of the RAM area, as is tabulated in FIG. 27.

The flow chart of the aforementioned photographic mode conversion subroutine of FIG. 25 will be described with reference to the conversion Table of FIG. 26. First of all, whether or not the AEL switch is turned ON is judged from the AEL bit at the address $04 of the RAM area. If the AEL switch is depressed, the AEL bit at the address $0A of the RAM area for determining the photographic mode is set with 1. Next, whether the AM input at the address $03 of the RAM area is at the side of the manual photography or the programmed automatic exposure is judged. For the AM input is "0" and if at the M side, it is further judged whether the bulb photography input at the address $03 of the RAM is "1" or not. For B=0, the photographic mode becomes manual. For B=1, on the contrary, the photographic mode becomes the bulb photography, and 1 is erected at the B mode of the address $0A of the RAM area.

If the AM input is "1" and at the program exposure side, on the contrary, whether or not the EF1 input on the strobo at the address $03 of the RAM area is "1" is examined. For "1", the photographic mode becomes that of EF1. If the EF1 input is "0", the EF2 input is then examined. For "1", the EF2 photographic mode is used. For "0", the bulb input B is examined. The bulb photography and the automatic program photography are used for B=1 and B=0, respectively. Number 1 is erected at the A mode of the address $0A of the RAM area. The modes M, B, A, EF1 and EF2 are set by the program until this stage. After that, the label L06 is entered, in which it is examined whether or not the self-timer input ST is 1. For 1, the B bit at the address $0A of the photographic mode RAM area is examined. Unless in the bulb photography, it is judged that the photographic mode is the ST. For another photography, it is judged that the mode is not the ST. Thus, the photographic mode conversion subroutine is ended.

After the judgement of the photographic mode, it is examined whether the $\phi_S$ and $\phi_{STS}$ are 1 or not. If both are "0", the task flies to the label BATC. (Here, the $\phi_S$ and $\phi_{STS}$ will be described hereinafter). If the $\phi_S$ is "1", on the contrary, the task flies to the sequence control for starting the photography. Moreover, if the $\phi_S$="0" and $\phi_{STS}$="1", the label SELF is entered for the self-timer photography.

First of all, the program after the task has flown to the label BATC will be described in the following. It is examined whether the voltage of the power source battery is sufficient or not. The consumption of the battery is detected as the battery check level in terms of the two levels BC1 and BC2. The BC1 level indicates that the photography is possible although the battery is consumed to some extent. Therefore, the replacement of the battery is urged by the battery replacement warning LEF in the finder. On the contrary, the level BC2 indicates that the battery has been very consumed to invite difficult for the photography. Below that level BC2, the photographic sequence is not entered even if the releases $S_1$ and $S_2$ are depressed. For BC2=1 at the label BATC, therefore, the photography is impossible. As a result, the $\phi_S$ and $\phi_{STS}$ are not erected, but the task flies to the label SiCH to examine again the $S_1$ and AEL inputs. If both are "0", it is judged that the operator has no willing to start the photography soon. Next, in order to await that the AEL is turned ON, the task is returned to the auto-load routine to rotate that loop.

Figures 28, 30:
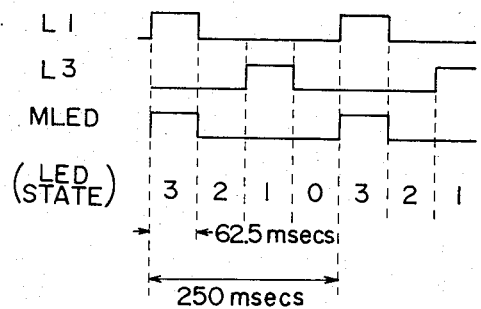
FIG. 28 is a table tabulating a display mode for displaying the exposure state in a finder.
FIG. 30 is a lighting timing chart of an LED for lighting in accordance with the LED display subroutine.

If the $S_1$ or AEL is depressed, on the contrary, the LED display subroutine in the finder is executed, and the task is returned to the label EMC. And, the photometric arithmetic and the LED display are repeated until the switch $S_2$ or ST is pushed. This LED display subroutine can be recognized in the present embodiment by the lighting or flashing operations of the four LEDs L1, L2, L3 and MLED in the finder. The lighting operation is conducted in accordance with the display mode tabulated in FIG. 28 such that the LEDs are lit for the signal in the state "1" but extinguished for "0" and such that the LEDs are flashed in a frequency of about 4 Hz for the signal "f". As the information for lighting or extinguishing the LEDs, there are: the bit 1 at the address $0B at the RAM area of the high brightness warning bit set by the photometric arithmetic routine; the bit 0 at the address $0B of the RAM area of the low brightness warning bit; A indicating the manual photography or the automatic exposure photography; the bit 2 at the address $0A of the RAM area; the bit "1" at the address $03 of the RAM area instructing that the battery should be replaced when the voltage drops; and the BC1. The program is first executed to light the LEDs for the manual mode, the high brightness and the low brightness so that the LEDs are lit for a period of 250 msecs for the manual photography and the battery check.

Figure 29:
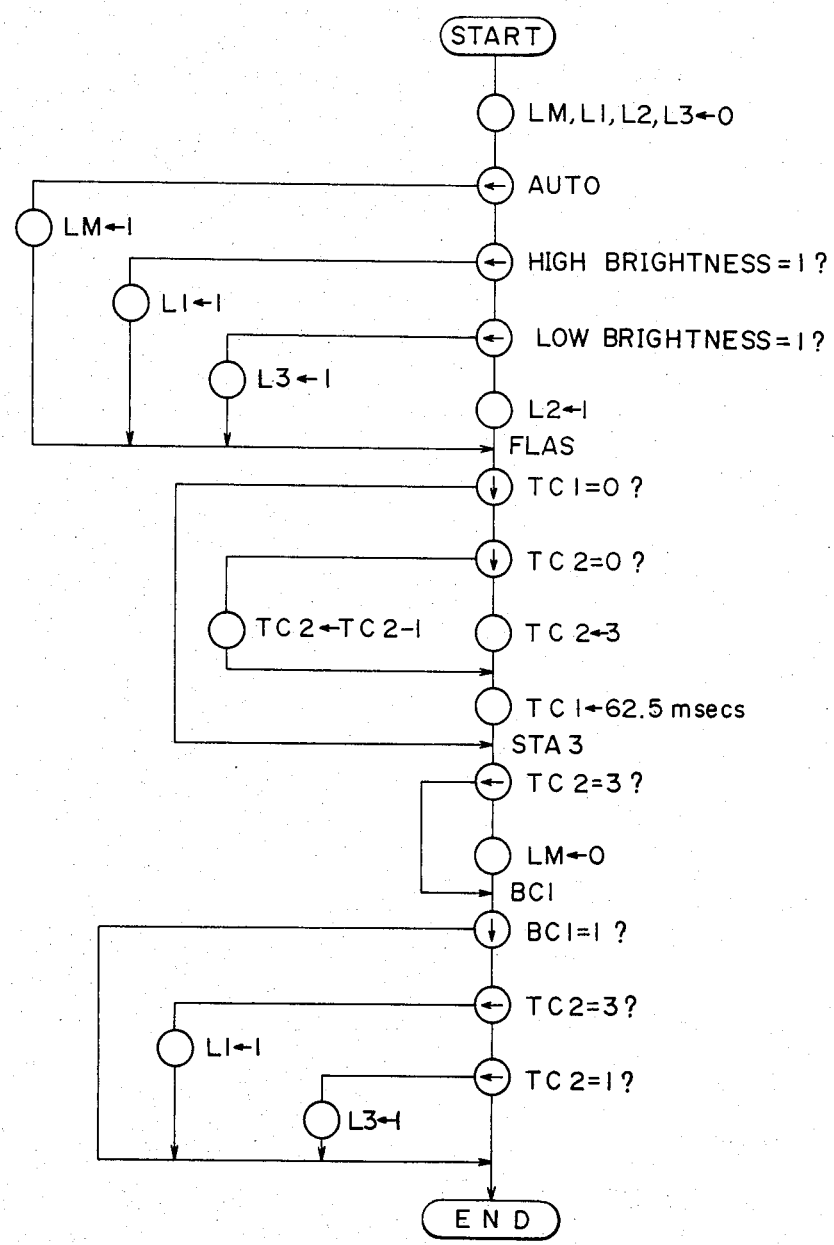
FIG. 29 is a flow chart showing the LED display subroutine for effecting an LED display as the display mode of FIG. 28.

Now, the description of that LED display subroutine will be made in accordance with the flow chart illustrated in FIG. 29.

When the present routine is entered, the initialization is conducted by clearing those areas in the RAM, which correspond to the signal for lighting the five LEDs. After that, each LED is lit in accordance with the display mode data, and the task enters the label FLAS. Then, a loop for the flashing operations is started and uses the TC1 as a timer, which has a lighting period of 62.5 msecs for the flashing operations, and the TC2 which is stored at the address $10 in the timer-RAM area which is not used as the memory of the LED states (LED and STATE) indicating the lighting and extinguishing states for flashing the LEDs. At the label FLAS, the value in the LED state is not changed unless the value of the TC1 is 0. As a result, the task flies to the label STA3. In case the TC1 becomes 0, however, the LED state value is counted down so that a shift is made to the next state. In case the state of the TC2 is 0, a signal 3 is fed to the TC2 thereby to effect the shift. After the LED state value has been changed in that way, the TC1 is again set with 62.5 msecs so as to change the next state, and the label STA3 is entered. First of all, it is examined whether the LED state value of the TC2 is 3 or not. In the case of 3, the MLED (or LM) is in its lit state in accordance with the lighting timing chart of FIG. 30 so that the label BC1 is entered as it is. In the state other than 3, the manual display LED, i.e., MLED is in its extinguished state so that the M display LED is extinguished for MLED=0, and the label BC1 is entered. By this time, the display mode in the case of BC1=0 is finished, and the flashing operations to be added are executed by the display in the case of BC1=1 from that label BC1. First, the L1 and L3 are lit in case the LED state values are 3 and 1, respectively, so that all the flashing operations are made possible by repeating the routine thus far described.

Then, the battery check of the BC2 of the label BATC in the main program is restored. If it is judged that the photography is possible for BC2=0, the $S_2$ and ST processing routines are entered. This routine task is used to effect the flags $\phi_S$ and $\phi_{STS}$ at the address $0A of the RAM area. The flag $\phi_S$ is erected to 1 in the usual photography, in which the second release switch $S_2$ is turned ON after the first release switch has been turned ON, and the sequence control is then entered.

Figure 31:
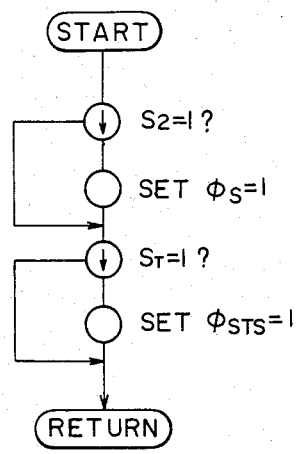
FIG. 31 is a flow chart showing the inputs of the $S_2$ switch and the self-timer ST of the release.

On the other hand, the flag $\phi_{STS}$ is set with 1 when the switch ST receives the ON signal at the time of the self-timer photography, and this self-timer starts its operation. As a result, when the flags $\phi_S$ and $\phi_{STS}$ are reset, i.e., for $\phi_S = \phi_{STS} = 0$, the sequence control and the self-timer operation are respectively prohibited. This flow chart is illustrated in FIG. 31.

Figure 32:
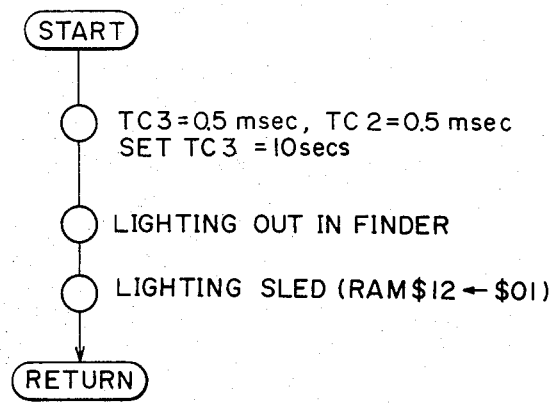
FIG. 32 is a flow chart showing the ST initialize routine.

Moreover, if the flag $\phi_S$ is at "1", the sequence control is entered by the subsequent program. For $\phi_{STS} = 1$, on the contrary, the self-timer operation routine at the label SELF is entered through the ST initialize routine. This ST initialize routine is illustrated in FIG. 32. As shown in FIG. 32 by the flow chart for setting the timer so as to prepare the display timing, the TC1 and TC3 are set with 0.5 sec and 10 secs, respectively, to extinguish the finder display, and the address $12 of the RAM area for the LED display is set with $01 so as to light the self-timer LED and the SLED (LS).

Here, the method of operating the long-time timer by the TC3 will be described in the following. Up to the short time 512 msecs, the timer can be operated by setting the down counter DC at 2 msecs and by counting the interruptions at every 2 msecs by means of the DC1 and DC2, as has been described hereinbefore. Here, the long-time timer can be achieved by further counting the TC1 and TC2 from the TC3 at the address $16 of the RAM area by means of a soft timer.

Figure 33:
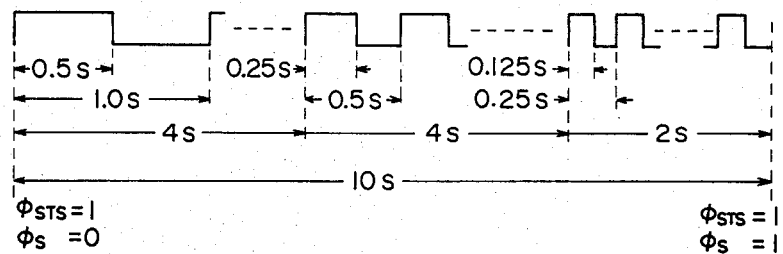
FIG. 33 is a flow chart showing a display timing for the self-timer.
Figure 34:
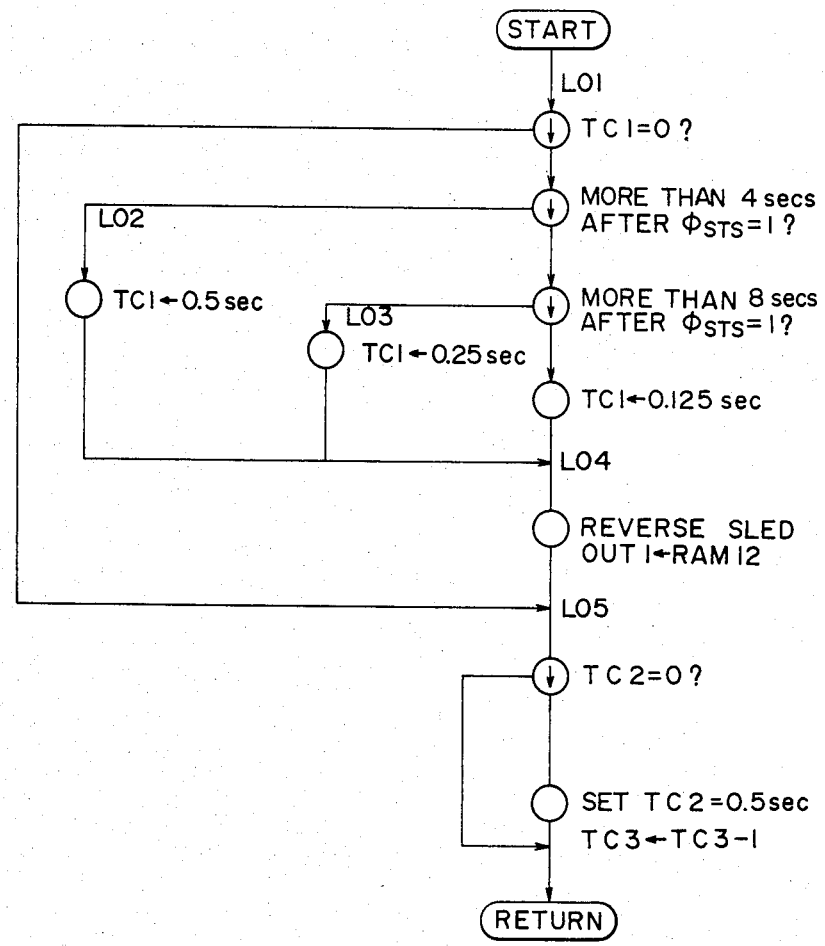
FIG. 34 is a flow chart showing the subroutine of a self-timer mode.

Now, in the main program, the self-timer subroutine from the label SELF is illustrated in the self-timer display timing illustrated in FIG. 33. As illustrated, the flashing operations are effected in a frequency of 1 Hz for 4 seconds after the start of the self-timer, in a frequency of 2 Hz for next 4 secs, and in a frequency of 4 Hz for remaining 4 secs. As a result, the time periods are measured by TC2 and TC3 so that the lit and extinguished operations of the flashing operations may be controlled by the TC1. First of all, in the ST mode subroutine program illustrated in FIG. 34, whether or not 0.5 sec has elapsed after the aforementioned flag $\phi_{STS}$ has been erected is examined depending upon whether or not TC1=0. Unless TC1≠"0", the task flies to the label L05. For TC1=1, whether 4 secs has elapsed after the flag $\phi_{STS}$ is measured by means of the TC3. For a period shorter than 4 secs, the task flies to the label L04 to reverse the SLED (which is the LS value at the address $12 of the RAM area). Simultaneously with this reversal (i.e., 1 is erected for 0 whereas 0 is selected if 1 is erected), the content at the address $12 of the RAM area is fed to the output port so that the SLED is lit→extinguished and extinguished→ lit thereby to execute the flashing operations. In the label L05, the present routine is left unless TC2=0. For TC=2, the TC2 is again set at 0.5 sec, and the TC3 is counted down until the present routine is left.

On the contrary, if 4 secs has elapsed after the flag $\phi_{STS}$ has been erected, the flashing period of the SLED is charged to 2 Hz. Therefore, the TC1 is set at 0.25 sec, and the label L04 is entered until the present routine is left in a similar manner. If 8 secs has elapsed after $\phi_{STS}=1$, moreover, the TC1 is set at 0.125 sec. Thus, the SLED of the self-timer LEDs can be displayed by rotating the loop in which the present routine is passed for 10 secs. The formation of the loop to be passed resorts to a method in which it is examined by the TC3 whether or not 10 secs have elapsed after $\phi_{STS}=1$ of the present routine and in which the task is returned to the label EMC if the lapse time is shorter 10 secs.

If 10 secs has elapsed after $\phi_{STS}=1$, the main routine finishes the display of the SLED thereby to start the photography. As a result, the main routine set the flag $\phi_S$ at 1 and resets the flag $\phi_{STS}$ until the sequence control illustrated in the main program of FIG. 6 is entered.

The flow chart of the sequence control will be described in the following on the basis of FIGS. 35-I and 35-II.

When the present program is entered, the content of the address $12 of the RAM area is cleared so as to extinguish the LED in the finder, and the aforementioned PRH2 (i.e., the task used for the sequence control) is assigned as the task of the interrupt program IRQP, thus ending the initialization of the present program.

Next, in order to select the photographic mode, the content of the RAM$0A of the photographic mode which has been decoded by the photographic mode conversion subroutine is read in the accumulator B to set the data such as the stop value control according to the photographic mode or the shutter second.

First of all, whether it is the EF1 mode (i.e., the stop number F 5.6 and the shutter speed of 1/100 sec) is judged. For EF1, the address ($0E) of the RAM area for the FS presetting is set at F 5.6, i.e., $50; the shutter mode RAM ($08) is set at $48; and the address $09 of the RAM area is set at 0 so that the program level SEQUE1 for starting the stop control is entered. Unless in the EF1 mode, whether it is in the EF2 mode (i.e., the stop value of F11 and the shutter speed of 1/100 sec) is judged. For the EF2 mode, the code value $70 of the F11 is set in the address $0E of the RAM area similarly to the EF1, and the time 1/100 secs is set in the addresses $08 and $09 of the RAM area so that the label name SEQUE1 is entered.

Next, it is judged whether it is in the manual photography or in the bulb photography. For either photography, the address $0E of the RAM area for the FS presetting purpose is set with the $EF which is the maximum of the data. This is because the iris-in is mechanically stopped by means of a retaining pin if the lens stop has its value changed from the open one to the F-number set for the iris-in so that the value set by the iris-in lens of the lens-mount may be effected for the manual or bulb photography. Thus, it is sufficient to set that value at a level higher than the maximum stop value F 22 (i.e., the arithmetic code $80) of the lens. After the value $FF has been set in the address $0E of the RAM area, the label name SEQUE1 is entered.

In the case of the manual photography, the camera according to the present embodiment adopts a system in which the shutter second is fixed at 1/100 sec and in which the stop can be selected by the lens. Therefore, the address $08 of the RAM area is set at 1/100 sec similarly to the EF mode.

Incidentally, although it is quite natural for the bulb photography, the shutter open time continues from the time when the release switch is turned ON to the time when the same is turned OFF.

In the case of neither the manual photography not the bulb photography, the remaining photographic mode is the program mode so that the shutter mode value and the FS preset value, which are calculated in the precedent CFT subroutine, are used.

As has been described hereinbefore, the controlled values of the F value and the T value for the respective photographic modes are set in the address $0E of the RAM area for the FS presetting operation and in the addresses $08 and $09 of the RAM area for the shutter mode. As a result, the label SEQUE1 for controlling the stop values are executed.

The signal $\beta$ is turned ON so as to supply the power to the photo-coupler 25 for controlling the stop value and to attract the stop magnet 16. Incidentally, the output terminal for the sequence control is set at the address $13 of the RAM area. By setting the TC2 at 70 ms and by restricting the time period for the stop control, moreover, it is possible to obviate the difficulties in which the F sensor has its counting operation stopped when in the manual or bulb photography.

Moreover, the time period of 10 msecs is prepared partly for stabilizing the photo-coupler and partly for delaying the operations of the mechanical parts under consideration. After that, the signal $\alpha$ is turn ON so that the attraction of the release magnet 18 is released to operate the hook lever 19 thereby to pop up the mirror 20 and to release the retention of the stop ring 21. Subsequent to this, the TC1 at the address $0F of the RAM area is set at 8 msecs thereby to prepare the timing for turning OFF the signal $\alpha$.

Thus, the F sensor Siemens' star 24 is rotated through the gear by the rotations of the stop ring so that the task enters the program for detecting the rotational information which is the output of the photo-coupler. This output of the photo-coupler is introduced into the FS of the input port at the bit "1" of the address $04 of the RAM, and the phototransistor breeder resistor of the photo-coupler can be adjusted so that the signals corresponding to the states "1" and "0" may be fed to the CPU.

According to this program, it is detected whether or not the FS input terminal is in the state "1". For the state "1", the program for detecting the state "0" is entered. In case the state is not "1", it is confirmed whether or it becomes the time second of 8 msecs for turning OFF the signal $\alpha$. If it is necessary to turn OFF the signal $\alpha$, this signal is turned OFF. Next, it is examined whether or not the TC2 takes 70 msecs. For 70 msecs, that FS detection program is left. In case the TC2 does not have 70 msecs, it is again whether or not the FS terminal is at "1". This loop is rotated until the state "1" is reached. If the state "1" is detected, the detecting loop for the state "0" is then entered to rotate in the similar manner to the "1" state detecting loop the loop in which it is detected whether or not the TC1 was at 8 msecs and whether or not the TC2 has elapsed 70 msecs. If the state "0" is detected, the value of the FS preset value of the set exposure determining signal, which is stored in the address $0E of the RAM area, is counted down only by one. If this subtracted value is reduced to 0, the FS detecting program is left. Unless the value is 0, it is confirmed that the TC2 has elapsed 70 msecs, and the task again returns to the loop for detecting the state "1" at the FS terminal.

In the case of the program exposure mode or the EF mode, as has been described hereinbefore, the signal is turned OFF, i.e., the power supply to the stop magnet 16 is interrupted when the stop ring 21 turns to the FS preset value or when the stop ring 21 has continues its rotations for a period longer than 70 msecs. As a result, the stop ratchet wheel 26 is retained to stop the rotations of the stop ring 21 so that the stop aperture of the lens is determined.

When the control of the stop value is ended, another program is entered, in which the shutter speed providing another factor for determining the exposure is controlled.

First of all, whether the photographic mode is of the bulb type or not is detected. In the case of the bulb type, the signal $\gamma$ is turned ON so as to run the front curtain, and the TC1 is set at 8 msecs thereby to prepare the timing for turning OFF the signal $\gamma$. This is conducted to turn ON the signal $\gamma$ at least for 8 msecs thereby to ensure the magnet operations.

Next, it is detected whether or not the $S_2$ switch of the second release switch is turned OFF. In the case of OFF, the signal $\delta$ is turned ON to run the rear curtain, thus ending the exposure. On the other hand, in case the aforementioned switch $S_2$ continues its ON state, it is detected whether or not 8 msecs has elapsed after the signal $\gamma$ has been turned ON. In the case of the elapse of 8 msecs, the signal $\gamma$ is turned OFF. The state $S_2$ is monitored until the switch $S_2$ is turned OFF. When the switch $S_2$ is turned OFF, the signal $\delta$ is turned ON, thus ending the shutter control of the bulb photography mode.

Next, in the case of the photographic mode other than the bulb photography, the shutter control is conducted in accordance with the values which are set in the addresses $08 and $09 of the shutter mode RAM area. However, since it takes the maximum 8 msecs to run the shutter curtain, there arise cases, in which the rear curtain start its running operation after the running operation of the front curtain has been finished, and in which the rear curtain starts its running operation during the running operation of the front curtain.

The former corresponds to the low-speed control case in which the shutter speed is higher than 1/25 sec, whereas the latter corresponds to the high-speed control case in which the shutter speed is lower than 1/125 sec. In accordance with the present program, the control of the shutter speed can be made stable and highly precise by the different control methods for the respective cases.

First of all, therefore, the content of the address $08 of the shutter mode RAM area is confirmed. In the low-speed control case having the shutter speed higher than 1/125 sec, the signal $\gamma$ is turned ON in accordance with the flow of the label SHUT so that 8 msecs is subracted from the content of the address $08 of the RAM.

Then, a period of 8 msecs is awaited after the signal $\gamma$ has been turned ON. Then, this signal $\gamma$ is turned OFF so that the contents at the addresses $08 and $09 of the RAM area for setting the shutter mode are transferred to the index counter having 16 bits. Here, the reason why 8 msecs was subtracted from the content at the address $08 of the RAM area determines the value of 8 msecs for the ON of the signal $\gamma$.

The TC1 is set at the value of 0.24 msec to count the number of the iRQ interruptions. When the TC1 is reduced to 0, 1 is subtracted from the values of the index counters, which are transferred from the addresses $08 and $09 of the RAM area, and the loop for setting the TC1 at 0.24 msec is continuously rotated until the index counter takes 0.

When the index counter takes 0, i.e., the shutter-open actual period which is determined by the exposure arithmetic, the front curtain signal $\delta$ is turned ON to finish the shutter speed control when in the low-speed control, until the task is shifted to the label SHUT3.

In the case of the high-speed control lower than 1/125 sec, on the contrary, the signal $\gamma$ is turned ON in accordance with the label name SHUT2. After that, the interrupt processing task PRH1 is set, as has been described in detail in the description of the iRQ program, so that the content at the address $08 of the RAM area is set in the down counter of the I/O unit which has its addresses assigned at $0D and $E107 of the down counter RAM area. The CPU awaits the interruption until the iRQ signal is generated by that down counter. When the interruption takes place, the signal $\delta$ is turned ON in the task PRH1 of the iRQ program so that the interrupt program is soon left. In case that the soft timer counting the hard timer is used, however, a program execution time which is spent for counting the hard timer becomes an error of the control time. Namely, the actual control time becomes (hard timer + program execution time) × n, where n is a count number. In this embodiment, the error becomes about +8.3% because the hard timer is 0.24 msec and the program execution time is about 0.02 msec. In the exposure control of camera, however, such error can be permitted fully.

In case that only the hard timer is used, on the contrary, the program execution time which is spent for the operation and the treatment of the hard timer is about 0.04 msec. In case that more than 1 msec is spent for the hard timer, the error time becomes (0.04 msec/hard timer), so that the control of higher accuracy can be carried out when only the hard timer is used than when only the soft timer is used.

If the entire period from 1 msec to 2 secs is used for the execution of the hard timer, however, the down counter and 13 bits are necessary, so that the load of the hardware increases.

Further, 13 clocks are necessary in the period from the interrupt generation to the interruption program operation in order to carry out the task of (recognition of interruption)→(program counter stack)→(index counter stack)→(AccA, AccB, CCR stack)→(new program counter set) after generation of the interruption (iRQ), if the interruption wait command is used as a hard timer processing. If the WAi command is used, however, it is possible to reduce the program execution time because the stack of AccA, AccB, CCR is completed before the generation of interruption and the interruption program is operated at 5 clocks after the generation of the interruption. Especially, it is an effective step when the clock which is shower than the clock frequency of CPU is used in this embodiment. After the period for turning ON the signal $\delta$ for 8 msecs in accordance with the program from the program label SHUT3 has been ensured, the signals $\gamma$ and $\delta$ are turned OFF. Then, the shutter control program portion is ended to finish the film exposure control.

Figure 36:
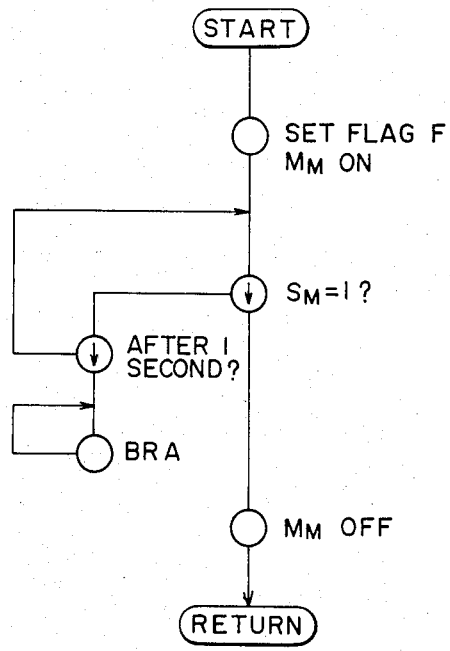
FIG. 36 is a flow chart showing a subroutine for executing a mirror shutter charge.

In order that the mirror charge may be effected for the subsequent photography at the end of the exposure control, the program for controlling the rotations of the mirror charge motor is executed. The flow chart is basically similar to the power-on subroutine, as illustrated in FIG. 36, so that it will be shortly touched. The flag F is erected, and the charge motor is turned ON. It is awaited while monitoring that the timer takes 1 sec until the motor operation monitor switch SM takes "1". When the timer takes 1 sec, the permanent loop is entered. For SM=1 one second before, on the contrary, the mirror shutter charge has been normally finished. As a result, the MM is turned OFF to leave the present loop.

Here, the charge motor MM has made the power source battery consume much power for the mirror shutter charge. Therefore, the consumption of the battery is interrupted for 20 msecs while awaiting the restoration of the power source battery so that the power can be sufficiently obtained from the battery for the subsequent film feeding operation.

Then, it is judged whether the multiple exposure is to be conducted or not. Since this multiple exposure effects multiple times exposures of an identical film frame, it is sufficient not to feed the film but to expose the same again. Therefore, whether or not the multiple exposure switch is turned ON. For the multiplex exposure ME=1, the film is not fed, but the auto-load subroutine is restored for the subsequent photography. If the photography is normal at ME=0, on the contrary, the film feed routine is entered.

This film feed routine is also basically similar to that which has been described in connection with the power-on routine. With reference to FIG. 37, first of all, the feed motor MF is turned ON, and whether or not the SF is 1 is monitored while monitoring 4 secs of the timer. If the switch SF takes 1, the feed motor is turned OFF, and the flag F is reset until the present routine is left. When more than 4 secs is elapsed at SF=0, the motor MF is once turned OFF, and it is awaited that the SR takes "1". After that, the motor MF is again turned ON to detect the edge of the SF signal, and the present routine is left for MF=0 and the flag=0 until the auto-load routine is entered for the subsequent photography.

The present invention has been described in connection with one embodiment in which the present invention is applied to the single lens reflex camera. Nevertheless, the present invention can be applied a variety of cameras having many kinds of microprocessors.

By applying the present invention to the camera which is equipped with the microcomputer used mainly for the camera sequence control, the several functions of the camera, e.g., the automatic exposure, the warning of an abnormal brightness, the self-timer function, the display of the self-timer, the automatic winding and rewinding functions, or the prohibition of the shutter ON for abnormal operation are made so organic that the used frequencies and importances of the various functions are judged by the camera in a predetermined manner thereby to make it possible to proceed the sequence control of the camera. Even during the procedure of the main program, a suitable interruption can be effected so that the sequence can be efficiently achieved.

In the present invention, more specifically, by using the interrupt processing of the microprocessor for the camera control, the various photographic informations can be received (or readin) for every predetermined time period irrespective of the proceeding course of the main program of the microprocessor. As a result, the microprocessor can be efficiently operated, and the reading operations of the various informations can be ensured.

These various informations, may include the aforementioned F-number information, ASA information, photometric information, and the input signal of the release switches or the like. As the photographic information, in addition, there exist numerous information, which are received for the controls and arithmetic operations for the photography. Of the various photographic informations, on the other hand, the inputs of the release signal, the photometry starting signal and the photometry information are desirably monitored at all times so that the existence and introduction of the signals may be executed as soon as possible. On the contrary, the input information such as the self-operation signal, the mode switching signal (concerning the propriety of the bulb photography), ASA information, or Fo information raises no special trouble even if the reading operation is delayed about 100 msecs after the information has been changed. In the present invention, therefore, the efficient information reading operation can be achieved by making a priority order in accordance with the importance (or urgency) of each input. As has been described hereinbefore, for example, the interrupt processing routine is so constructed that the aforementioned photographic informations may be read in integral times of the interrupt signals. Thus, an inequality of $m < n$ is made to hold if the period for reading in the information having a high priority such as the release signal, the photometry start signal or the photometric information is set m times as long as the interrupt period, and if the period for reading in the information having a lower priority such as the aforementioned self-operation signal or the switching signal is set n times as long as the interrupt period. By making the reading period of the information having a higher priority shorter than the input reading period of another information, more specifically, the reading operation can be achieved with a less time delay.

By weighing in accordance the priority of the input information, i.e., by varying the reading period, on the other hand, the efficient input reading operation can be achieved, as has been described hereinbefore. In addition, the flashing period of the exposure display based upon the photometry (i.e., the brightness warning display) or the power source voltage warning display can be varied in accordance with the importance of the warning itself.

The timer interruptions of different periods are effected between the sequence, in which at least one of the mirror control, the stop control and the shutter control is conducted for exposure control, and the photometry in which the photometry input, the exposure arithmetic and the display based upon that arithmetic are conducted for said exposure control. As a result, it is possible to achieve the highly efficient photographic control.

In the so-called "photometry", in which the reading of the input information, the exposure arithmetic and the display of the exposure state are conducted, more specifically, the operations of the microprocessor is based mainly upon the calculations, whereas, in the so-called "sequence control", in which the controls of the mirror, the stop and the shutter and the film feed are conducted, the operations of the microprocessor are based mainly upon the drive controls of the mechanical parts. By changing the time control for the photometry and for the sequence, i.e., by changing the interrupt period providing a reference for the reading period, therefore, the interrupt period for the sequence can be made shorter than that for the photometry, as has been described hereinbefore. As a result, the control precision of the microprocessor can be improved.

By providing the interrupt program with the program to be used only as the timer and the program for another timer in parallel with each other, and by not executing the latter task during the aforementioned sequence but only as the timer, the execution time period of the interrupt program can be shortened so that the speed-up of the main routine can be achieved.

This speed-up is also achieved by the use of the hard timer (which may be a timer circuit composed of discrete parts such as CR) which is built in the microprocessor or externally disposed when in the shutter speed control, by the use of only the hard timer when in the high-speed shutter operation requiring the precision of about 0.1 msec, or by counting the hard timer in a software manner when in the low-speed shutter operation for the elongated exposure.

Furthermore, the shutter control can be conducted by the timer interruption when in the high-speed shutter operation. In the prior art, on the contrary, the down counter is set with the second of said high-speed shutter simultaneously with the generation of the front curtain starting signal of the shutter, and it is awaited while rotating the loop of the program that the predetermined shutter second is reached so that the interrupt signal is received, whereby the waiting loop is left in response to the interrupt signal thereby to generate the rear curtain starting signal of the shutter.

In this case, it takes much processing time that the interrupt program is entered and left. This processing time raises an error in the high-speed shutter second so that the precision of the shutter second is deteriorated.

In the present invention, on the contrary, the interruption is awaited after the shutter front curtain starting signal, and the shutter rear curtain starting signal is generated in accordance with the interrupt program so that the processing time is remarkably shortened to ensure the high-speed shutter second of high precision.

Especially, the present invention provides a method which is effective in case the fundamental clocks of the microprocessor are retarded to reduce the power consumption.

As has been described hereinbefore, according to the present invention, in order to make efficient the interrupt processing in the photographic control, the A/D converted information and the input information by the various switches are temporarily stored in the memory means (i.e., the RAM), as illustrated in the aforementioned RAM map, and the information is then taken out of said RAM map so that it may be used for the arithmetic or control purposes.

Incidentally, FIGS. 38-I and -II tabulate one example of the list of the interrupt processing program which is used in the present invention.

What is claimed is:

1. A method of controlling a camera having a release means which can be operated at two stages, a microprocessor, a clock signal generating means which generates clock signals regularly, and a counter means characterized by comprising the steps of
   (a) completing the arrangement for operation of the counter means according to a first stage operation of the release means,
   (b) applying an output from the counter means as an interruption signal on the microprocessor when the number of clock signals from the clock signal generating means has a fixed relation with a preset value setting for the counter means,
   (c) introducing selectively an information in a plurality of photographic informations to the microprocessor according to a specific program based on the interruption signal,
   (d) preparing the reoperation of the counter means so as to obtain regular interruption signals based on the preset value of the counter means,
   (e) introducing selectively an information in the photographic informations to the microprocessor according to the priority level thereof by next interruption signal,
   (f) repeating the above steps applying an output from the counter means as an interruption signal on the microprocessor when the number of clock signals from the clock signal generating means has a fixed relation with a preset value setting for the counter means, introducing selectively an information in the photographic informations to the microprocessor according to the priority level thereof by next interruption signal, and
   (g) introducing to the microprocessor photographic informations at higher priority levels many times more than that at lower priority levels.

2. A method of controlling a camera as set forth in claim 1, wherein the information at the higher priority level of said various photographic informations is at least one of a release signal, a photometry start signal and a photometry introduction signal.

3. A method of controlling a camera as set forth in claim 1, wherein said interrupt processings are periodic ones, and wherein an inequality of m<n holds when the information at the higher priority level of said various photographic informations is fed with a period m times as long as an interrupt period whereas the information at the lower priority level is fed with a period n times as long as said interrupt period.

4. A method of controlling a camera as set forth in claim 1, wherein a preset value of the counter is set by the microprocessor, so that an interruption generating period at the exposure operation which is performed at the first stage of the release means is made different from that at the sequence control which is executed at the second stage of the release means.

5. A method of controlling a camera as set forth in claim 4, wherein a relation of $T_1 > T_2$ is maintained, $T_1$ being the interruption generating period at the exposure operation and $T_2$ being the interruption generating period at the sequence control.

6. A method of controlling a camera having a release means which can be operated at two stages, a microprocessor, a clock signal generating means which generates clock signals regularly, and a counter means characterized by comprising the steps of
   (a) completing the arrangement for operation of the counter means according to a first stage operation of the release means,
   (b) applying an output from the counter means as an interruption signal on the microprocessor when the number of clock signals from the clock signal generating means has a fixed relation with a preset value setting for the counter means,
   (c) introducing selectively an information in a plurality of photographic informations to the microprocessor according to a specific program based on the interruption signal, (d) preparing the reoperation of the counter means so as to obtain regular interruption signals based on the preset value of the counter means, (e) introducing selectively an information in the photographic informations to the microprocessor according to the priority level thereof by next interruption signal, (f) repeating the above steps applying an output from the counter means as an interruption signal on the microprocessor when the number of clock signals from the clock signal generating means has a fixed relation with a preset value setting for the counter means, introducing selectively an information in the photographic informations to the microprocessor according to the priority level thereof by next interruption signal, (g) introducing to the microprocessor photographic informations at higher priority levels many times more than that at lower priority levels, (h) storing the informations in RAM at the interrupt processings, and (i) executing the photographic sequence by utilizing the data of RAM after the interrupt processings are finished.

7. A method of controlling a camera as set forth in claim 5, wherein the interruption signal is generated in the microprocessor by a timer circuit, the interruption signal of a constant period is counted at the low speed shutter control, and the preset value of the timer circuit is varied at the high speed shutter control.

8. A method of controlling a camera as set forth in claim 7, wherein the interruption signal detection at the high speed shutter control is executed by an interruption waiting.

* * * * *